US008320562B2

(12) United States Patent
Hammond et al.

(10) Patent No.: US 8,320,562 B2
(45) Date of Patent: Nov. 27, 2012

(54) METHODS FOR CREATING SECRET KEYS BASED UPON ONE OR MORE SHARED CHARACTERISTICS AND SYSTEMS THEREOF

(75) Inventors: Peter M. Hammond, Rochester, NY (US); James F. Munro, Walworth, NY (US); Steven C. Kapp, Fairport, NY (US)

(73) Assignee: Digital Lobe, LLC, Rochester, NY (US)

( * ) Notice: Subject to any disclaimer, the term of this patent is extended or adjusted under 35 U.S.C. 154(b) by 1201 days.

(21) Appl. No.: 11/733,619

(22) Filed: Apr. 10, 2007

(65) Prior Publication Data

US 2009/0052663 A1  Feb. 26, 2009

Related U.S. Application Data

(60) Provisional application No. 60/790,654, filed on Apr. 10, 2006.

(51) Int. Cl.
*H04L 9/00* (2006.01)
(52) U.S. Cl. ......................................................... 380/44
(58) Field of Classification Search .................. 380/260, 380/44–47; 713/171
See application file for complete search history.

(56) References Cited

U.S. PATENT DOCUMENTS

| 5,126,746 | A | 6/1992 | Gritton |
| 6,052,466 | A * | 4/2000 | Wright ........................... 380/262 |
| 6,223,291 | B1 | 4/2001 | Puhl et al. |
| 6,377,810 | B1 | 4/2002 | Geiger et al. |
| 6,442,532 | B1 | 8/2002 | Kawan |
| 6,913,194 | B2 | 7/2005 | Suzuki |
| 6,925,565 | B2 | 8/2005 | Black |
| 6,925,566 | B1 | 8/2005 | Feigen et al. |
| 6,961,541 | B2 | 11/2005 | Overy et al. |
| 6,970,518 | B2 | 11/2005 | Kuffner et al. |
| 6,992,580 | B2 | 1/2006 | Kotzin et al. |
| 6,996,403 | B2 | 2/2006 | Shi et al. |
| 6,996,547 | B1 | 2/2006 | Tugenberg et al. |
| 7,202,941 | B2 | 4/2007 | Munro |
| 2002/0035687 | A1* | 3/2002 | Skantze ........................ 713/168 |
| 2002/0066018 | A1* | 5/2002 | Linnartz ....................... 713/171 |
| 2006/0059093 | A1* | 3/2006 | Takaragi et al. ................ 705/51 |
| 2006/0129836 | A1 | 6/2006 | Kao et al. |
| 2007/0188323 | A1* | 8/2007 | Sinclair et al. ............. 340/568.1 |
| 2008/0155261 | A1* | 6/2008 | Sato et al. ..................... 713/169 |
| 2008/0220724 | A1* | 9/2008 | Roh et al. ..................... 455/66.1 |

OTHER PUBLICATIONS

Hubaux, J-P., "New Research Challenges for the Security of Ad Hoc and Sensor Networks," ESAS 2004 (Powerpoint presentation).
Capkun & Hubaux, "Secure Positioning of Wireless Devices with Application to Sensor Networks," 24th Annual Joint Conference of the IEEE Computer and Communications Societies, Proceedings IEEE 3(13-17):1917-1928 (2005).
Li et al., "Securing Wireless Localization: Living with Bad Guys," in DIMACS Workshop on Mobile and Wireless Security, pp. 1-2 (2004).

* cited by examiner

*Primary Examiner* — Eleni Shiferaw
*Assistant Examiner* — Jing Sims
(74) *Attorney, Agent, or Firm* — LeClairRyan, a Professional Corporation

(57) ABSTRACT

A method and system for generating one or more keys includes obtaining at two or more devices data based on movement of at least one of the devices with the respect to the other device. At least one key is generated based on the obtained data at each of the devices for use in securing communications between the devices. The key at each of the devices is substantially the same.

51 Claims, 13 Drawing Sheets

| MEASUREMENT NUMBER | DISTANCE (m) | P-VELOCITY | INT P-VELOCITY | BINARY P-VELOCITY |
|---|---|---|---|---|
| 0 | 0.200000 | 6230046.88 | 6230046 | 0101111100010000000011110 |
| 1 | 0.197087 | 5771826.54 | 5771826 | 0101100000010010000110010 |
| 2 | 0.194185 | 5298719.90 | 5298719 | 0101000011011010000011111 |
| 3 | 0.191304 | 4812654.14 | 4812654 | 0100100110111101101110 |
| 4 | 0.188454 | 4315577.52 | 4315577 | 0100000111011001101111001 |
| 5 | 0.185645 | 3809448.07 | 3809448 | 0011101000100000101101000 |
| 6 | 0.182888 | 3296222.60 | 3296222 | 0011001001001011111011110 |
| 7 | 0.180192 | 2777845.39 | 2777845 | 0010101001100010111110101 |
| 8 | 0.177567 | 2256240.35 | 2256240 | 0010001001101101011100000 |
| 9 | 0.175021 | 1733296.12 | 1733296 | 0001101001110010101100000 |
| 10 | 0.172563 | 1210861.64 | 1210861 | 0001001001111001111101101 |
| 11 | 0.170202 | 690734.84 | 690734 | 0000101010000101000101110 |
| 12 | 0.167945 | 174655.03 | 174655 | 0000001010101010001111 |
| 13 | 0.165799 | 335704.68 | 335704 | 0000010100011111010110000 |
| 14 | 0.163770 | 838744.10 | 838744 | 0000110011001100010110000 |
| 15 | 0.161866 | 1332942.00 | 1332942 | 0001010001010110110010110 |
| 16 | 0.160090 | 1816861.38 | 1816861 | 0001101101110010001101 |
| 17 | 0.158449 | 2289153.94 | 2289153 | 0010001011101110000000001 |
| 18 | 0.156946 | 2748563.77 | 2748563 | 0010100111110000100010011 |
| 19 | 0.155585 | 3193930.26 | 3193930 | 0011000010111100010010110 |
| 20 | 0.154369 | 3624190.26 | 3624190 | 0011011101001100111111110 |
| 21 | 0.153300 | 4038379.42 | 4038379 | 0011110110011101111101011 |
| 22 | 0.152380 | 4435632.85 | 4435632 | 0100001101011101011000 |
| 23 | 0.151611 | 4815185.05 | 4815185 | 0100100101110010101001 |
| 24 | 0.150991 | 5176369.19 | 5176369 | 0100111011111100011001 |
| 25 | 0.150522 | 5518615.73 | 5518615 | 0101010000110101000101111 |
| 26 | 0.150203 | 5841450.44 | 5841450 | 0101100100100010001010 |
| 27 | 0.150032 | 6144491.92 | 6144491 | 0101110111000011110011 |
| 28 | 0.150008 | 6370458.79 | 6370458 | 0110000100110100100011010 |
| 29 | 0.150129 | 6076946.41 | 6076946 | 0101110010111010000100010 |
| 30 | 0.150391 | 5767551.47 | 5767551 | 0101100000000001011111 |
| 31 | 0.150792 | 5443127.63 | 5443127 | 0101001100001110001101 |
| 32 | 0.151328 | 5104559.38 | 5104559 | 0100110111110001110101111 |
| 33 | 0.151995 | 4752758.50 | 4752758 | 0100100010000101011 |
| 34 | 0.152789 | 4388660.36 | 4388660 | 0100001011101110011010 |
| 35 | 0.153705 | 4013220.42 | 4013220 | 0011110100111100101001 |
| 36 | 0.154738 | 3627410.59 | 3627410 | 0011011101011001100010010 |
| 37 | 0.155834 | 3232215.82 | 3232215 | 0011000101010001110101 |
| 38 | 0.157136 | 2828630.64 | 2828630 | 0010101101010100101010110 |
| 39 | 0.158490 | 2417655.97 | 2417655 | 0010010011100011110111 |
| 40 | 0.159940 | 2000295.85 | 2000295 | 0001111010000101101011 |
| 41 | 0.161483 | 1577554.53 | 1577554 | 0001100000010010010 |
| 42 | 0.163104 | 1150433.58 | 1150433 | 0001000110011011110001 |
| 43 | 0.164806 | 719929.15 | 719929 | 0000101011111000011001 |
| 44 | 0.166580 | 287029.56 | 287029 | 0000010001100001001101 |
| 45 | 0.168421 | 147287.12 | 147287 | 0000010001111101010111 |
| 46 | 0.170323 | 582055.16 | 582055 | 0001000111000110100111 |
| 47 | 0.172279 | 1016323.13 | 1016323 | 0000111110000100000011 |
| 48 | 0.174285 | 1449155.69 | 1449155 | 0001011000011100110000011 |
| 49 | 0.176333 | 1879635.11 | 1879635 | 0001110010101110010011 |

FIG. 9

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| 0 | 0 | 1 | 0 | 1 | 1 | 1 | 1 | 1 | 0 | 0 | 0 | 1 | 0 | 0 | 0 | 0 | 0 | 0 | 0 | 1 | 1 | 1 | 1 | 0 |
| 1 | 0 | 1 | 0 | 1 | 1 | 0 | 0 | 0 | 0 | 0 | 0 | 1 | 0 | 0 | 1 | 0 | 0 | 0 | 1 | 1 | 0 | 0 | 1 | 0 |
| 2 | 0 | 1 | 0 | 1 | 0 | 0 | 0 | 0 | 1 | 1 | 0 | 1 | 1 | 0 | 1 | 0 | 0 | 0 | 0 | 1 | 1 | 1 | 1 | 1 |
| 3 | 0 | 1 | 0 | 0 | 1 | 0 | 0 | 1 | 0 | 1 | 1 | 0 | 1 | 1 | 1 | 1 | 0 | 1 | 1 | 0 | 1 | 1 | 1 | 0 |
| 4 | 0 | 1 | 0 | 0 | 0 | 0 | 0 | 1 | 1 | 1 | 0 | 1 | 1 | 0 | 0 | 1 | 1 | 0 | 1 | 1 | 1 | 0 | 0 | 1 |
| 5 | 0 | 0 | 1 | 1 | 1 | 0 | 1 | 0 | 0 | 0 | 1 | 0 | 0 | 0 | 0 | 0 | 1 | 0 | 1 | 0 | 1 | 0 | 0 | 0 |
| 6 | 0 | 0 | 1 | 1 | 0 | 0 | 1 | 0 | 0 | 1 | 0 | 0 | 1 | 0 | 1 | 1 | 1 | 1 | 0 | 1 | 1 | 1 | 1 | 0 |
| 7 | 0 | 0 | 1 | 0 | 1 | 0 | 1 | 0 | 0 | 1 | 1 | 0 | 0 | 0 | 1 | 0 | 1 | 1 | 1 | 1 | 0 | 1 | 0 | 1 |
| 8 | 0 | 0 | 1 | 0 | 0 | 0 | 1 | 0 | 0 | 1 | 1 | 0 | 1 | 1 | 0 | 1 | 0 | 1 | 1 | 1 | 0 | 0 | 0 | 0 |
| 9 | 0 | 0 | 0 | 1 | 1 | 0 | 1 | 0 | 0 | 1 | 1 | 1 | 0 | 0 | 1 | 0 | 1 | 0 | 1 | 1 | 0 | 0 | 0 | 0 |
| 10 | 0 | 0 | 0 | 1 | 0 | 0 | 1 | 0 | 0 | 1 | 1 | 1 | 1 | 0 | 0 | 1 | 1 | 1 | 1 | 0 | 1 | 1 | 0 | 1 |
| 11 | 0 | 0 | 0 | 0 | 1 | 0 | 1 | 0 | 1 | 0 | 0 | 0 | 1 | 0 | 1 | 0 | 0 | 0 | 1 | 0 | 1 | 1 | 1 | 0 |
| 12 | 0 | 0 | 0 | 0 | 0 | 0 | 1 | 0 | 1 | 0 | 1 | 0 | 1 | 0 | 1 | 0 | 0 | 0 | 1 | 1 | 1 | 1 | 1 | 1 |
| 13 | 0 | 0 | 0 | 0 | 1 | 0 | 1 | 0 | 0 | 0 | 1 | 1 | 1 | 1 | 1 | 1 | 0 | 1 | 0 | 1 | 1 | 0 | 0 | 0 |
| 14 | 0 | 0 | 0 | 0 | 1 | 1 | 0 | 0 | 1 | 1 | 0 | 0 | 1 | 1 | 0 | 0 | 0 | 1 | 0 | 1 | 1 | 0 | 0 | 0 |
| 15 | 0 | 0 | 0 | 1 | 0 | 1 | 0 | 0 | 1 | 0 | 1 | 0 | 0 | 1 | 1 | 0 | 1 | 1 | 0 | 0 | 1 | 1 | 1 | 0 |
| 16 | 0 | 0 | 0 | 1 | 1 | 0 | 1 | 1 | 0 | 1 | 1 | 1 | 1 | 0 | 0 | 1 | 0 | 0 | 0 | 1 | 1 | 1 | 0 | 1 |
| 17 | 0 | 0 | 1 | 0 | 0 | 0 | 1 | 0 | 1 | 1 | 0 | 0 | 1 | 1 | 1 | 0 | 0 | 0 | 0 | 0 | 0 | 0 | 0 | 1 |
| 18 | 0 | 0 | 1 | 0 | 1 | 0 | 0 | 1 | 1 | 1 | 1 | 1 | 0 | 0 | 0 | 0 | 1 | 0 | 0 | 1 | 0 | 0 | 1 | 1 |
| 19 | 0 | 0 | 1 | 1 | 0 | 0 | 0 | 0 | 1 | 0 | 1 | 1 | 1 | 1 | 0 | 0 | 0 | 1 | 0 | 0 | 1 | 0 | 1 | 0 |
| 20 | 0 | 0 | 1 | 1 | 0 | 1 | 1 | 1 | 0 | 1 | 0 | 0 | 1 | 1 | 0 | 0 | 1 | 1 | 1 | 1 | 1 | 1 | 1 | 0 |
| 21 | 0 | 0 | 1 | 1 | 1 | 1 | 0 | 1 | 1 | 0 | 0 | 1 | 1 | 1 | 0 | 0 | 1 | 1 | 1 | 0 | 1 | 0 | 1 | 1 |
| 22 | 0 | 1 | 0 | 0 | 0 | 0 | 1 | 1 | 1 | 0 | 1 | 0 | 1 | 1 | 1 | 0 | 1 | 0 | 1 | 1 | 0 | 0 | 0 | 0 |
| 23 | 0 | 1 | 0 | 0 | 1 | 0 | 0 | 1 | 0 | 1 | 1 | 1 | 1 | 0 | 0 | 1 | 0 | 1 | 0 | 1 | 0 | 0 | 0 | 1 |
| 24 | 0 | 1 | 0 | 0 | 1 | 1 | 0 | 1 | 1 | 1 | 1 | 1 | 1 | 1 | 0 | 0 | 0 | 0 | 1 | 1 | 0 | 0 | 0 | 1 |
| 25 | 0 | 1 | 0 | 1 | 0 | 1 | 0 | 0 | 0 | 0 | 1 | 1 | 0 | 1 | 0 | 1 | 0 | 0 | 0 | 1 | 0 | 1 | 1 | 1 |
| 26 | 0 | 1 | 0 | 1 | 1 | 0 | 0 | 1 | 0 | 0 | 1 | 0 | 0 | 0 | 1 | 0 | 0 | 0 | 0 | 1 | 0 | 1 | 0 | 1 |
| 27 | 0 | 1 | 0 | 1 | 1 | 1 | 0 | 1 | 1 | 1 | 0 | 0 | 0 | 0 | 0 | 0 | 1 | 0 | 0 | 1 | 0 | 1 | 0 | 1 |
| 28 | 0 | 1 | 1 | 0 | 0 | 0 | 0 | 1 | 0 | 0 | 0 | 1 | 1 | 1 | 1 | 0 | 0 | 0 | 0 | 1 | 0 | 0 | 1 | 0 |
| 29 | 0 | 1 | 0 | 1 | 1 | 1 | 0 | 0 | 1 | 0 | 0 | 0 | 0 | 0 | 0 | 1 | 0 | 1 | 1 | 1 | 1 | 1 | 1 | 1 |
| 30 | 0 | 1 | 0 | 1 | 1 | 0 | 0 | 0 | 0 | 0 | 0 | 0 | 0 | 0 | 0 | 1 | 0 | 1 | 1 | 1 | 1 | 1 | 1 | 1 |
| 31 | 0 | 1 | 0 | 1 | 0 | 0 | 1 | 1 | 0 | 0 | 0 | 0 | 1 | 1 | 1 | 0 | 0 | 0 | 1 | 1 | 0 | 1 | 1 | 1 |
| 32 | 0 | 1 | 0 | 0 | 1 | 1 | 0 | 1 | 1 | 1 | 1 | 0 | 0 | 0 | 1 | 1 | 1 | 0 | 1 | 0 | 1 | 1 | 1 | 1 |
| 33 | 0 | 1 | 0 | 0 | 1 | 0 | 0 | 0 | 1 | 0 | 0 | 0 | 0 | 1 | 0 | 1 | 0 | 1 | 1 | 1 | 0 | 1 | 1 | 0 |
| 34 | 0 | 1 | 0 | 0 | 0 | 0 | 1 | 0 | 1 | 1 | 1 | 1 | 0 | 1 | 1 | 1 | 0 | 0 | 1 | 1 | 0 | 1 | 0 | 0 |
| 35 | 0 | 0 | 1 | 1 | 1 | 1 | 0 | 1 | 0 | 0 | 1 | 1 | 1 | 1 | 0 | 0 | 1 | 0 | 1 | 0 | 0 | 1 | 0 | 0 |
| 36 | 0 | 0 | 1 | 1 | 0 | 1 | 1 | 1 | 0 | 1 | 0 | 1 | 1 | 0 | 0 | 1 | 1 | 0 | 0 | 1 | 0 | 0 | 1 | 0 |
| 37 | 0 | 0 | 1 | 1 | 0 | 0 | 0 | 0 | 1 | 0 | 1 | 0 | 1 | 0 | 0 | 1 | 1 | 1 | 0 | 1 | 0 | 1 | 1 | 1 |
| 38 | 0 | 0 | 1 | 0 | 1 | 0 | 1 | 1 | 0 | 0 | 1 | 0 | 1 | 0 | 0 | 1 | 0 | 1 | 0 | 1 | 0 | 1 | 1 | 0 |
| 39 | 0 | 0 | 1 | 0 | 0 | 1 | 0 | 0 | 1 | 1 | 1 | 0 | 0 | 0 | 1 | 1 | 1 | 1 | 1 | 1 | 0 | 1 | 1 | 1 |
| 40 | 0 | 0 | 0 | 1 | 1 | 1 | 1 | 0 | 1 | 0 | 0 | 0 | 0 | 1 | 0 | 1 | 1 | 0 | 1 | 0 | 0 | 1 | 1 | 1 |
| 41 | 0 | 0 | 0 | 1 | 1 | 0 | 0 | 0 | 0 | 0 | 0 | 1 | 0 | 0 | 1 | 0 | 0 | 1 | 0 | 1 | 0 | 0 | 1 | 0 |
| 42 | 0 | 0 | 0 | 1 | 0 | 0 | 0 | 1 | 1 | 0 | 0 | 0 | 1 | 1 | 0 | 1 | 1 | 1 | 1 | 0 | 0 | 0 | 0 | 1 |
| 43 | 0 | 0 | 0 | 0 | 1 | 0 | 1 | 0 | 1 | 1 | 1 | 1 | 1 | 1 | 0 | 0 | 0 | 0 | 1 | 1 | 1 | 0 | 0 | 1 |
| 44 | 0 | 0 | 0 | 0 | 0 | 1 | 0 | 0 | 0 | 1 | 1 | 0 | 0 | 0 | 0 | 1 | 0 | 0 | 1 | 1 | 0 | 1 | 0 | 1 |
| 45 | 0 | 0 | 0 | 0 | 0 | 0 | 1 | 0 | 0 | 0 | 1 | 1 | 1 | 1 | 1 | 1 | 0 | 1 | 0 | 1 | 0 | 1 | 1 | 1 |
| 46 | 0 | 0 | 0 | 0 | 1 | 0 | 0 | 0 | 1 | 1 | 1 | 0 | 0 | 0 | 0 | 1 | 1 | 0 | 1 | 0 | 0 | 0 | 1 | 1 |
| 47 | 0 | 0 | 0 | 0 | 1 | 1 | 1 | 1 | 1 | 0 | 0 | 0 | 0 | 0 | 1 | 0 | 0 | 0 | 0 | 0 | 0 | 0 | 1 | 1 |
| 48 | 0 | 0 | 0 | 1 | 0 | 1 | 1 | 0 | 0 | 0 | 0 | 1 | 1 | 1 | 0 | 0 | 1 | 1 | 0 | 0 | 0 | 0 | 1 | 1 |
| 49 | 0 | 0 | 0 | 1 | 1 | 1 | 0 | 0 | 1 | 0 | 1 | 0 | 1 | 1 | 1 | 0 | 0 | 1 | 0 | 1 | 0 | 0 | 1 | 1 |

METHODS FOR CREATING SECRET KEYS BASED UPON ONE OR MORE SHARED CHARACTERISTICS AND SYSTEMS THEREOF

This application claims the benefit of U.S. Provisional Patent Application Ser. No. 60/790,654, filed Apr. 10, 2006, which is hereby incorporated by reference in its entirety.

FIELD OF THE INVENTION

The present invention generally relates to systems and methods for cryptographic communications and, more particularly, to systems and methods for simultaneously and independently generating at least one secret key used for encryption and message integrity checking upon data sent between two electronic devices based on measurements of one or more common or shared characteristics of the devices.

BACKGROUND

A recurring problem in symmetric cryptography is the distribution of secret keys. Secret keys are required for symmetric encryption and decryption of messages transmitted over an insecure medium, such as over a wireless radio link or over the Internet. In electronic communications, secret keys are also used to provide a secure integrity check that ensures messages have not been modified during transmission. In addition, electronic communication systems also routinely use knowledge of secret keys to demonstrate proof of identity (authentication).

Unfortunately, it is problematic to distribute a secret key over a communication channel before that communication channel has been secured. The paradox is that the communication channel cannot be secured until the secret key has been distributed—this is the "chicken and egg" problem for symmetric encryption systems. Two methods are in common commercial use for avoiding this problem.

The first commonly-used method of solving the key distribution problem is to switch to a public-key encryption system and avoid the distribution of secret keys. Each party in a public-key communication scheme has two keys: a public key that may be widely known and a private key that is known only to the appropriate party. To communicate with another party, the transmitting party need only have knowledge of the recipient's public key. The recipient is responsible for keeping its private key safe. Public-key cryptography partially solves the initial key distribution problem that plague symmetric encryption algorithms, but the algorithms used for public-key encryption and decryption are computationally intensive. It is not uncommon to see a public-key algorithm operate 100 times slower than a symmetric key algorithm. Public-key algorithms also have limitations on the size of each transmitted message, while these limitations are not generally found in symmetric encryption algorithms.

The second commonly-used method of solving the key distribution problem is to have the communication parties jointly agree upon a secret key without transmitting the secret key over the insecure communication channel. Several algorithms are available and in wide use in commercially-available electronic communication systems today. Most of these algorithms are based upon the infeasibility of performing some types of mathematical operations, such as computing the discrete logarithm of a very large number containing hundreds of digits. In other words, the strength of the key agreement algorithm rests upon the assumption that it is computationally infeasible for an attacker to bypass the algorithm. Because the algorithms are mathematically-based, the possibility exists that a simpler solution may exist, some day be discovered, and be employed. This outcome would negate the effectiveness of the algorithm and thus this method.

SUMMARY

A method for generating one or more keys in accordance with embodiments of the present invention includes obtaining at two or more devices data based on movement of at least one of the devices with the respect to the other device. One or more keys are generated based on the obtained data at each of the devices for use in securing communications between the devices. The one or more keys at each of the devices are substantially the same.

A system for generating one or more keys in accordance with other embodiments of the present invention includes a data acquisition system and a key generation system. The data acquisition system at each of two or more devices obtains data based on movement of at least one of the devices with the respect to the other device. The key generation system generates one or more keys based on the obtained data from each of the data acquisition systems for use in securing communications between the devices. The one or more keys at each of the devices are substantially the same.

A method for securing communications by independently generating one or more keys in accordance with other embodiments of the present invention includes obtaining data based on one or more shared characteristics between two or more devices. One or more keys are generated based on the obtained data on the one or more shared characteristic independently at one or more of the devices. The one or more generated keys are used for securing communications without transmitting the one or more generated keys between the devices.

A system for securing communications by independently generating one or more keys in accordance with other embodiments of the present invention includes one or more data acquisition systems, a key generation system, and one or more communication systems. The data acquisition systems obtain data based on one or more shared characteristics between two or more devices. The key generation system generates one or more keys based on the obtained data on the one or more shared characteristic independently at one or more of the devices. The communication systems use one or more of the generated keys for securing communications without transmitting the one or more generated keys between the devices.

In accordance with other embodiments of the present invention, identical sequences of keying material are created which are suitable for the establishment of a secure data communication channel based upon a common property of the communicating devices, such as the shared distance or velocity between them. The bits for the key are generated from a plurality of distance or velocity measurements which after averaging and filtering the distance and/or velocity data, a number of measurements equal to a number of desired key bits are generated. By way of example, a common number of key bits is 128 so to generate those key bits a sufficient number of discrete distance or velocity measurements are required that yield 128 random bits. The measurement data is converted to an integer data type and optionally is converted from binary coding to Gray coding. Next, a bit is selected from each integer that is not influenced by measurement noise and is measurably random value is used as a key bit. A string of such key bits are selected from the measurements to be used as the secret key. Since the measurement setup and the process employed to generate the key bits is common to the devices, the devices will independently arrive at the same secret key.

Accordingly, the present invention provides an effective and secure method and system for simultaneously and independently generating one or more secret keys for encrypting and decrypting data sent between devices based on measurements of one or more common or shared characteristics. The present invention also is an effective and secure method for simultaneously and independently generating one or more secret keys that provide for secure message integrity checks on data transmitted between devices. These generated secret keys can be used in standard cryptographically-secure communication schemes.

BRIEF DESCRIPTION OF THE DRAWINGS

FIG. 9 is a table of intermediate data used to generate bits from which the secret key is generated; and FIG. 10 is a table of bits with regions of noisy bits, measurably random bits, deterministic non-random bits, and zero bits.

DETAILED DESCRIPTION

Figure 1:
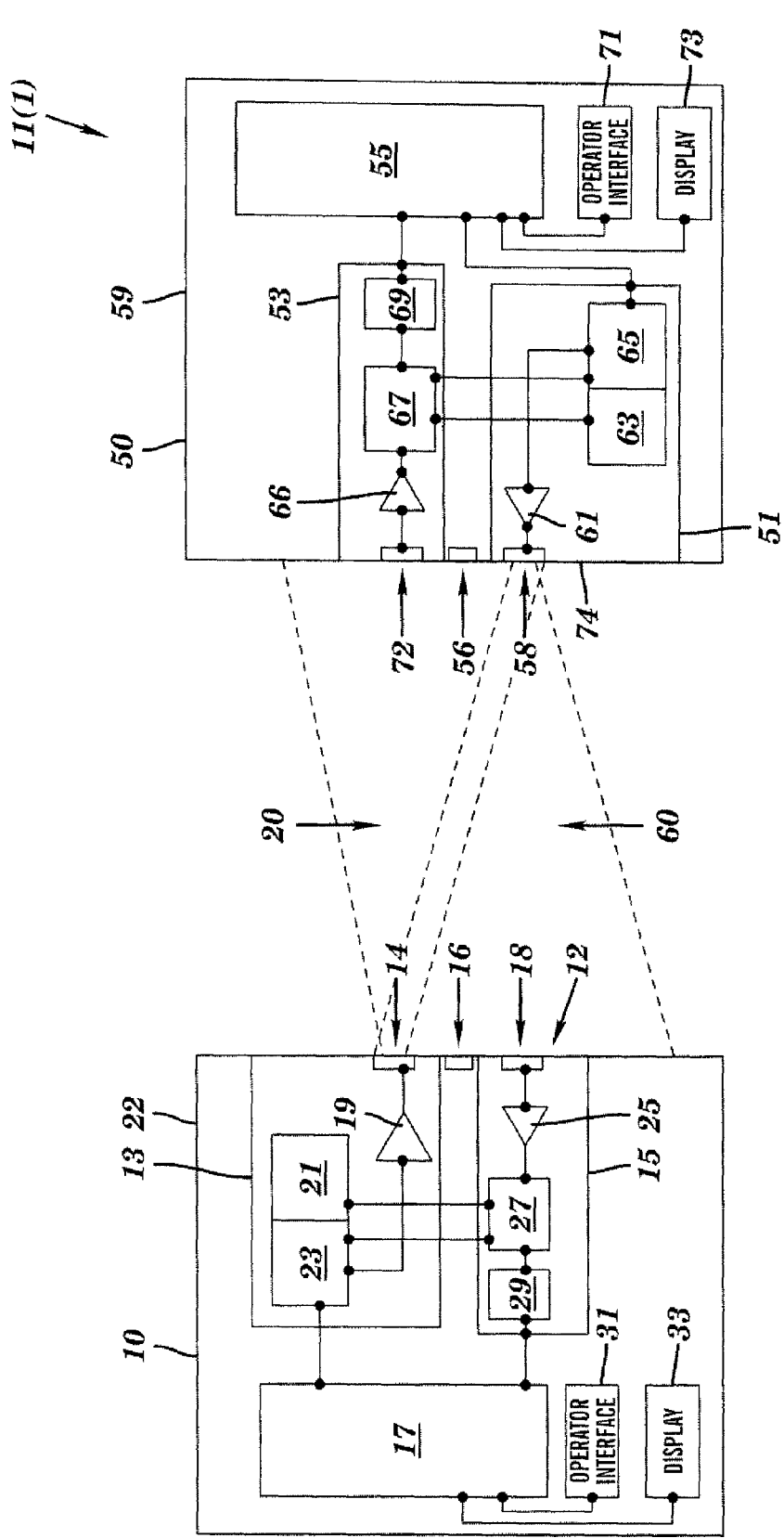
FIG. 1 is a top view of a system for independently generating one or more keys at two or more devices in accordance with embodiments of the present invention.

A system 11(1) for generating one or more secret keys in accordance with embodiments of the present invention is illustrated in FIG. 1. The system includes a fixed position device 10 with a transmission system 13, a reception system 15, and a processing system 17 and a non-fixed position or mobile device 50 with a transmission system 51, a reception system 53, and a processing system 55, although the system 11(1) can include other types and numbers of components, devices, and/or systems configured in other manners. Accordingly, the present invention provides an effective and secure method and system for simultaneously and independently generating key material suitable for securing data sent between devices based on measurements of one or more common or shared characteristics.

Referring more specifically to FIG. 1, the fixed position device 10 is a system that generates one or more secret keys independently and substantially simultaneously with the non-fixed position device 50 based on distance measurements between the fixed position device 10 and the non-fixed position device 50, although other types and numbers of systems and devices which measure other characteristics, such as distance, velocity, pseudo velocity, acceleration, or pseudo acceleration, could be used. Since the structure and operation of systems which could be used to obtain a plurality of measurements of a shared characteristic between devices 10 and 50, such as distance or velocity, are well known to those or ordinary skill in the art, they will not be described in detail herein. By way of example only, a system for obtaining a plurality of distance measurements to a target which could be used herein is disclosed in U.S. Pat. No. 7,202,941, which herein incorporated by reference in its entirety.

In this particular embodiment, the fixed position device 10 is a point-of-sale (POS) terminal, although other types and numbers of devices could be used, such as a desktop computer, and the devices could be mobile. Additionally, in this particular embodiment the emissions used by the fixed position device 10 to measure distance are optical, although other types and numbers of emissions could be used. The fixed position device 10 includes a housing 22 with a surface 12 which has a reflecting element 16, although the housing 22 could have other shapes and configurations. The reflecting element 16 is a white diffuse reflector and material on the surface 12 surrounding the reflecting element 16 is absorptive, although other types and numbers of reflecting elements and adjacent materials on surface 12 could be used and the reflecting element is optional. The reflecting element 16 also has beaded retroreflectors or prism-based retroreflectors which help with optical gain, although again other types and numbers of reflecting elements could be used and the reflecting element is optional.

The transmission system 13 includes an energy emitter 14, a driver 19, a clock system 21, and a burst waveform generator 23 which generates and transmits the burst waveform emission 20 towards the non-fixed position device 50 for generating the bits of the keys and for communications between devices 10 and 50, although other types and numbers of transmission systems with other types and numbers of systems and components. In this particular embodiment, the energy emitter 14 is a set of LEDs or laser diodes which transmit optical radiation, although other types and numbers of energy emitters could be used which emit in other emissions in other frequencies of electromagnetic energy, such as RF, in which case energy emitter 14 is an antenna. By way of example only, other types of emissions which could be used are acoustic, magnetic, electrostatic, or a hybrid of two or more of these. If electromagnetic energy is used, the carrier can be either in the radio frequency (RF) portion of the spectrum or in the millimeter-wave (MMW), microwave, infrared (IR), visible, or ultraviolet (UV) energy. In this particular embodiment, the burst waveform generator 23 is coupled to the processing system 17 and the clock system 21 and generates the burst waveform emission 20 which is transmitted to the driver 19 and output by the energy emitter 20, although other configurations with other numbers and types of components could be used. The energy emitter 14 transmits the emission in a defined envelope or cone 20 to reduce the probability of interception, although other types and numbers of emission paths could be used.

The reception system 15 includes the receiver 18, an amplifier 25, a sampling system 27, and a filtering system 29 which receives signals for generating the bits of the keys and for communications between devices 10 and 50, although other types and numbers of reception systems with other types and numbers of systems and components and which receive other types and numbers of emissions could be used. In this particular embodiment, the receiver 18 is coupled to an amplifier 25 and receives the detected emission which is amplified by the amplifier 25. The amplified emission is sampled by the sampling system 27 and then is optionally filtered by filtering system 29 before transmission to the processing system 17. In this particular embodiment, the receiver 18 comprises PN, PIN, or APD photodiodes to receive the electromagnetic radiation in the optical spectrum, although other types and numbers of receiving elements and other types of emissions could be received. By way of example only, if the radiation is RF, then the receiver 18 will be an antenna. Although a separate transmission system 13 and reception system 15 are shown, other types and numbers of communication systems can be used for functions, such as the generation of the secret keys and for communications, such as a transceiver system.

The processing system 17 is coupled to and controls the operations of the transmission system 13 and the reception system 15, although other types and numbers of processing systems coupled to other types and numbers of systems could be used. The processing system 17 includes a processing unit and a memory along with an operator interface 31 and a display 33, although the processing system 17 can have other numbers and types of devices and components and the devices components can be in other locations and configurations. The memory stores programmed instructions and data for generating one or more secret keys as described and illustrated herein, including: converting obtained measurement data, such as distance, velocity, or pseudo velocity with respect to time, into one or more parameters, such as distance, velocity, pseudo velocity, acceleration, or pseudo acceleration; determine if a sufficient amount of the data has been obtained for averaging; determines if distance measurements are less than a distance threshold; determining if the obtained data is less than a data threshold for generating one or more keys; averaging one or more portions of the obtained data; converting the obtained data into a plurality of binary numbers; selecting at least one bit from at least a portion of the binary numbers to generate one or more keys; determining a first set of least significant bits in the binary numbers with noise above a noise threshold; determining a second set of most significant bits in the binary numbers which are not measurably random; determining a third set of one or more bits in each of the binary numbers which are measurably random; identifying a presence of one of the devices with respect to another one of the devices; determining if there is adequate signal strength for the obtaining the data; and synchronizing the systems before each of the data acquisition systems obtains the data, although other types and numbers of instructions and data can be stored and executed and some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processing unit, can be used for the memory.

The operator interface 31 is used to input data, such as information to complete a transaction, although other types of data could be input. The operator interface 31 comprises a keyboard, although other types and numbers of operator interfaces can be used. The display 33 is used to show data and information to the user, such as a transaction status and result, although other types of data and information could be displayed and other manners of providing the information can be used. The display 33 comprises a display screen, such as an LCD screen by way of example only, although other types and numbers of displays could be used. In this particular embodiment, the operator interface 31 and display 33 are shown separate from the processing system 17, although other configurations can be used, such as having the operator interface 31 and display 33 as part of the processing system 17.

The non-fixed position device 50 also is a system that generates one or more secret keys independently and substantially simultaneously with the fixed position device 10 based on distance measurements between the fixed position device 10 and the non-fixed position device 50, although other types and numbers of systems and devices which measure other characteristics, such as distance, velocity, pseudo velocity, acceleration, or pseudo acceleration, could be used. Again, since the structure and operation of systems which could be used to obtain a plurality of measurements of a shared characteristic between devices 10 and 50, such as distance or velocity, are well known to those or ordinary skill in the art, they will not be described in detail herein. By way of example only, a system for obtaining a plurality of distance measurements to a target which could be used herein is disclosed in U.S. Pat. No. 7,202,941, which herein incorporated by reference in its entirety.

The non-fixed position device 50 is a cell phone, although other types and numbers of devices could be used, such as a mobile handset, personal digital assistant (PDA), or other portable electronic device, and the devices could have a fixed position. Additionally, in this particular embodiment the emissions used by the non-fixed position device 50 to measure distance are optical, although other types and numbers of emissions could be used. The non-fixed position device 50 includes a housing 59 with a surface 74 which has a reflecting element 56, although the housing 59 could have other shapes and configurations. The reflecting element 56 is a white diffuse reflector and material on the surface 74 surrounding the reflecting element 16 is absorptive, although other types and numbers of reflecting elements and adjacent materials on surface 74 could be used and the reflecting element is optional. The reflecting element 56 also has beaded retroreflectors or prism-based retroreflectors which help with optical gain, although again other types and numbers of reflecting elements could be used and the reflecting element is optional.

The transmission system 51 includes an energy emitter 58, a driver 61, a clock system 63, and a burst waveform generator 65 which generates and transmits the burst waveform emission 60 towards the fixed position device 10 for generating the bits of the keys and for communications between devices 10 and 50, although other types and numbers of transmission systems with other types and numbers of systems and components. In this particular embodiment, the energy emitter 58 is a set of LEDs or laser diodes which transmit optical radiation, although other types and numbers of energy emitters could be used which emit in other emissions in other frequencies of electromagnetic energy, such as RF, in which case energy emitter 58 is an antenna. By way of example only, other types of emissions which could be used are acoustic, magnetic, electrostatic, or a hybrid of two or more of these. If electromagnetic energy is used, the carrier can be either in the radio frequency (RF) portion of the spectrum or in the millimeter-wave (MMW), microwave, infrared (IR), visible, or ultraviolet (UV) energy. In this particular embodiment, the burst waveform generator 65 is coupled to the processing system 55 and the clock system 63 and generates the burst waveform emission 60 which is transmitted to the driver 61 and output by the energy emitter 58, although other configurations with other numbers and types of components could be used. The energy emitter 58 transmits the emission in a defined envelope or cone 60 to reduce the probability of interception, although other types and numbers of emission paths could be used.

The reception system 53 includes the receiver 72, an amplifier 66, a sampling system 67, and a filtering system 69 which receives signals for generating the bits of the keys and for communications between devices 10 and 50, although other types and numbers of reception systems with other types and numbers of systems and components and which receive other types and numbers of emissions could be used. In this particular embodiment, the receiver 72 is coupled to an amplifier 66 and receives the detected emission which is amplified by the amplifier 66. The amplified emission is sampled by the sampling system 67 and then is optionally filtered by filtering system 69 before transmission to the processing system 55. In this particular embodiment, the receiver 72 comprises PN, PIN, or APD photodiodes to receive the electromagnetic radiation in the optical spectrum, although other types and numbers of receiving elements and other types of emissions could be received. By way of example only, if the radiation is RF, then the receiver 18 will be an antenna. Although a separate transmission system 51 and reception system 53 are shown, other types and numbers of communication systems can be used for functions, such as the generation of the secret keys and for communications between the devices 10 and 50, such as a transceiver system.

The processing system 55 is coupled to and controls the operations of the transmission system 51 and the reception system 53, although other types and numbers of processing systems coupled to other types and numbers of systems could be used. The processing system 55 includes a processing unit and a memory along with an operator interface 71 and a display 73, although the processing system 55 can have other numbers and types of devices and components and the devices components can be in other locations and configurations. The memory stores programmed instructions and data for generating one or more secret keys as described and illustrated herein, including: converting obtained measurement data, such as distance, velocity, or pseudo velocity with respect to time, into one or more parameters, such as distance, velocity, pseudo velocity, acceleration, or pseudo acceleration; determine if a sufficient amount of the data has been obtained for averaging; determines if distance measurements are less than a distance threshold; determining if the obtained data is less than a data threshold for generating one or more keys; averaging one or more portions of the obtained data; converting the obtained data into a plurality of binary numbers; selecting at least one bit from at least a portion of the binary numbers to generate one or more keys; determining a first set of least significant bits in the binary numbers with noise above a noise threshold; determining a second set of most significant bits in the binary numbers which are not measurably random; determining a third set of one or more bits in each of the binary numbers which are measurably random; identifying a presence of one of the devices with respect to another one of the devices; determining if there is adequate signal strength for the obtaining the data; and synchronizing the systems before each of the data acquisition systems obtains the data, although other types and numbers of instructions and data can be stored and executed and some or all of these instructions and data may be stored elsewhere. A variety of different types of memory storage devices, such as a random access memory (RAM), a read only memory (ROM) or a floppy disk, hard disk, CD ROM, or other computer readable medium which is read from and/or written to by a magnetic, optical, or other reading and/or writing system coupled to the processing unit, can be used for the memory.

The operator interface 71 is used to input data, such as information to complete a transaction, although other types of data could be input. The operator interface 71 comprises a keyboard, although other types and numbers of operator interfaces can be used. The display 73 is used to show data and information to the user, such as a transaction status and result, although other types of data and information could be displayed and other manners of providing the information can be used. The display 73 comprises a display screen, such as an LCD screen by way of example only, although other types and numbers of displays could be used. In this particular embodiment, the operator interface 71 and display 73 are shown separate from the processing system 55, although other configurations can be used, such as having the operator interface 71 and display 73 as part of the processing system 55.

Although in this particular embodiment, the system 11(1) comprises the fixed position device 10 and the non-fixed position device 50 are shown, the system 11(1) could comprise other types and numbers of devices in other configurations. By way of example only, multiple fixed position devices 10 and multiple non-fixed position devices 50 could be arranged in a network configuration over which secure digital information is transmitted using the one or more secret keys generated in accordance with the present invention.

Although an exemplary fixed position device 10 and a non-fixed position device 50 are described and illustrated herein, at least portions of these devices, such as processing systems 17 and 55, can be implemented on any suitable computer system or computing device, programmable logic device, application specific integrated circuit, and the like. It is to be understood that the devices and systems of the embodiments described herein are for exemplary purposes, as many variations of the specific components, hardware and software used to implement the exemplary embodiments are possible, as will be appreciated by those skilled in the relevant art(s).

Furthermore, at least portions of each of the devices of the exemplary embodiments may be conveniently implemented using one or more general purpose computer systems, microprocessors, digital signal processors, micro-controllers, and the like, programmed according to the teachings of the exemplary embodiments, as described and illustrated herein, and as will be appreciated by those skilled in the computer and software arts.

In addition, two or more computing systems or devices can be substituted for at least portions of the devices in any embodiment of the exemplary embodiments. Accordingly, principles and advantages of distributed processing, such as redundancy, replication, and the like, also can be implemented, as desired, to increase the robustness and performance of at least portions of the devices. The exemplary embodiments may also be implemented on computer system or systems that extend across any suitable network using any suitable interface mechanisms and communications technologies, including by way of example only telecommunications in any suitable form (e.g., voice, modem, and the like), wireless communications media, wireless communications networks, cellular communications networks, G3 communications networks, Public Switched Telephone Network (PSTNs), Packet Data Networks (PDNs), the Internet, intranets, and combinations thereof.

At least portions of the exemplary embodiments may also be embodied as a computer readable medium having instructions stored thereon for managing windows within an Internet browser window, as described herein, which when executed by a processor, cause the processor to carry out the steps necessary to implement at least portions of the methods of the exemplary embodiments, as described and illustrated.

Figure 2A:
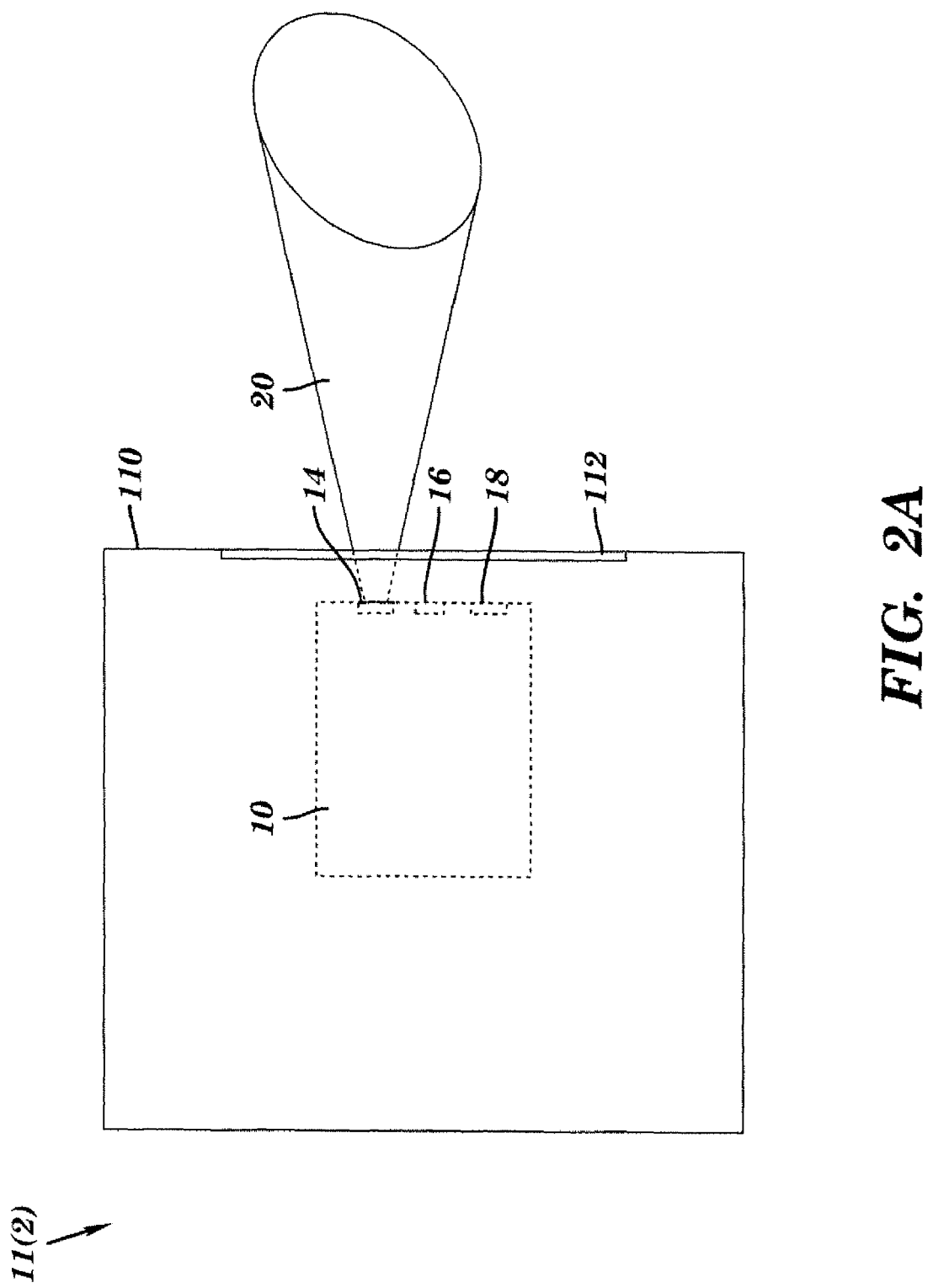
FIG. 2A is a top-view of the fixed position device enclosed in an opaque housing in another system for generating one or more keys in accordance with other embodiments of the present invention.
Figure 2B:
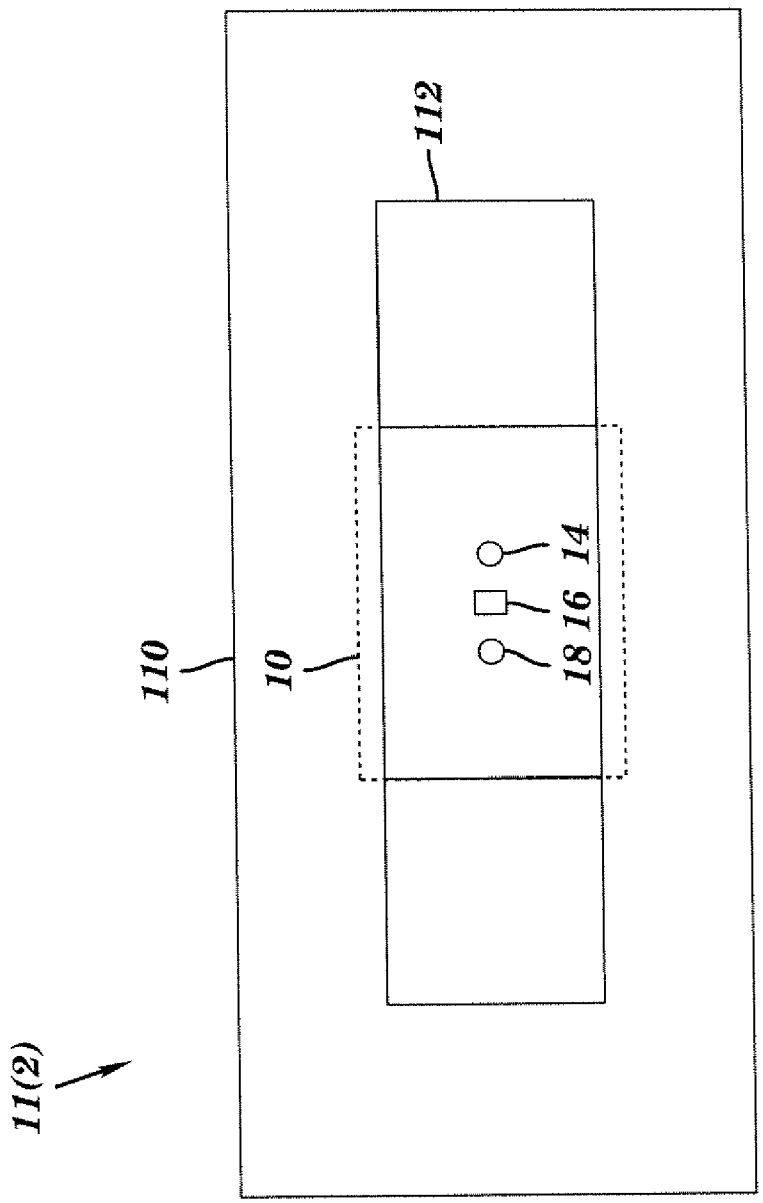
FIG. 2B is a side-view of the fixed position device enclosed in an opaque housing shown in FIG. 2A.

Another system 11(2) for generating one or more secret keys in accordance with other embodiments of the present invention is illustrated in FIGS. 2A and 2B. System 11(2) is the same as system 11(1) except as described herein. In system 11(2), the fixed position device 10 is enclosed in an opaque housing 110 which has a window 112, although the opaque housing 110 with the window 112 can be used with other devices, such as with non-fixed position device 50. The window 112 in the opaque housing is positioned so the energy emitter 14 and the receiver 16 can emit and receive emissions, although other types of at least partially transparent covers or openings could be used. With the opaque housing 110, the fixed position device 10 can still operatively communicate with non-fixed position device 50, while at the same time the surface 12 of device 10 is blocked from view from those trying to independently measure the swipe profile between fixed position device 10 and non-fixed position device 50. The processing system 17 has stored data on the distance between the surface 12 and the energy emitter 14 and the receiver 18, although other manners for obtaining this distance can be used.

Figure 3:
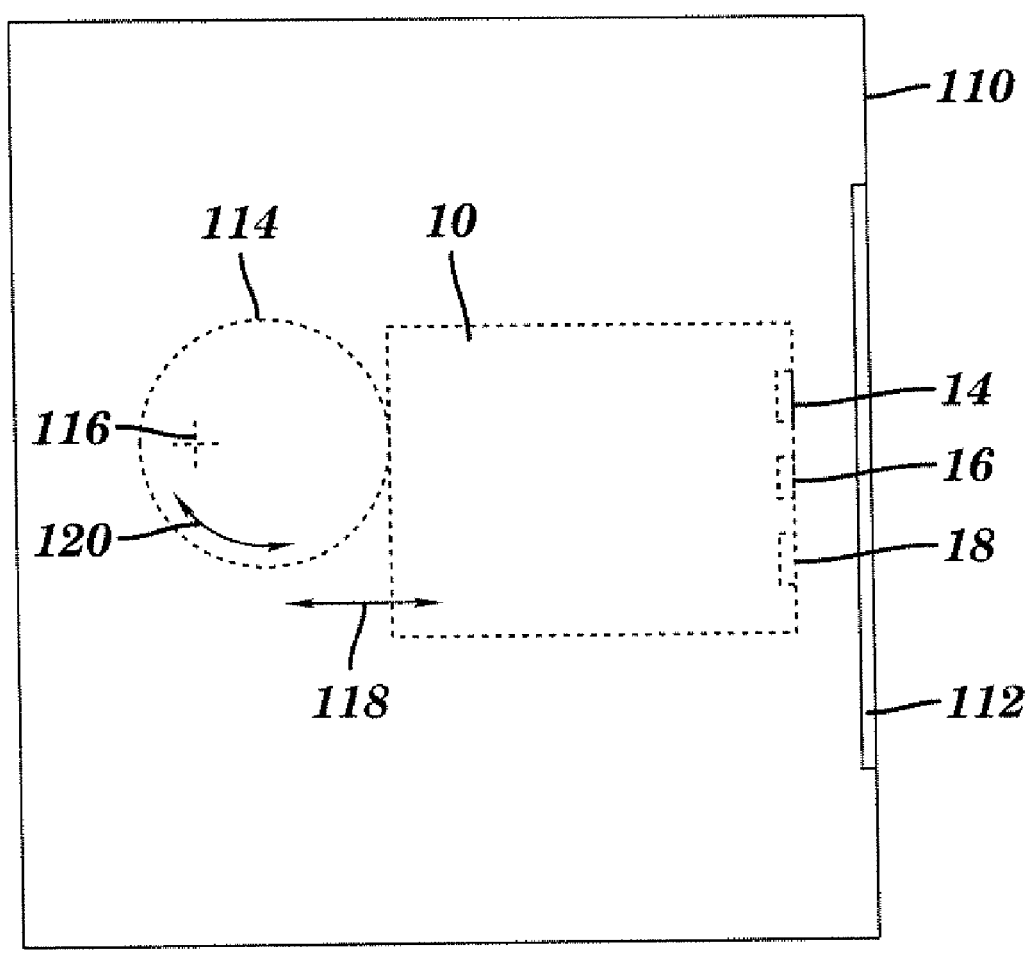
FIG. 3 is a top-view of the fixed position device enclosed in an opaque housing and adjustable with a cam system another system for generating one or more keys in accordance with other embodiments of the present invention.

Another system 11(3) for generating one or more secret keys in accordance with other embodiments of the present invention is illustrated in FIG. 3. System 11(3) is the same as system 11(2) except as described herein. In system 11(3), the fixed position device 10 also is enclosed in the opaque housing 110 with the window 112 as described with reference to FIGS. 2A and 2B, although the opaque housing 110 is optional. Additionally, a cam system 116 is coupled to the fixed position device 10, although other types and numbers of cam systems or other movement systems can be used. When the cam system 116 is rotated in the direction of arrow 120, the cam system 116 causes the fixed position device 10 to move longitudinally in the direction of arrow 118, although the cam system 116 can be positioned to move the fixed position device 110 in other directions. For example, the cam system 116 could be coupled to a side of fixed position device 10 perpendicular to the connection side illustrated in FIG. 3 which will laterally move the fixed position device 10. In another example, two or three cams systems can simultaneously be used to move the fixed position device 10 in two or three different axis, respectively. The rotation of the cam system 116 is at continuous constant velocity, although the cam system 116 can be rotated in other manners, such as randomly, periodically, pseudo-randomly, or with a chaotic velocity. The cam system 116 operation is controlled and monitored by the processing system 17 so that the processing system 17 can accurately determine the distance between the energy emitter 14 and receiver 18 and the window 112.

Figure 4:
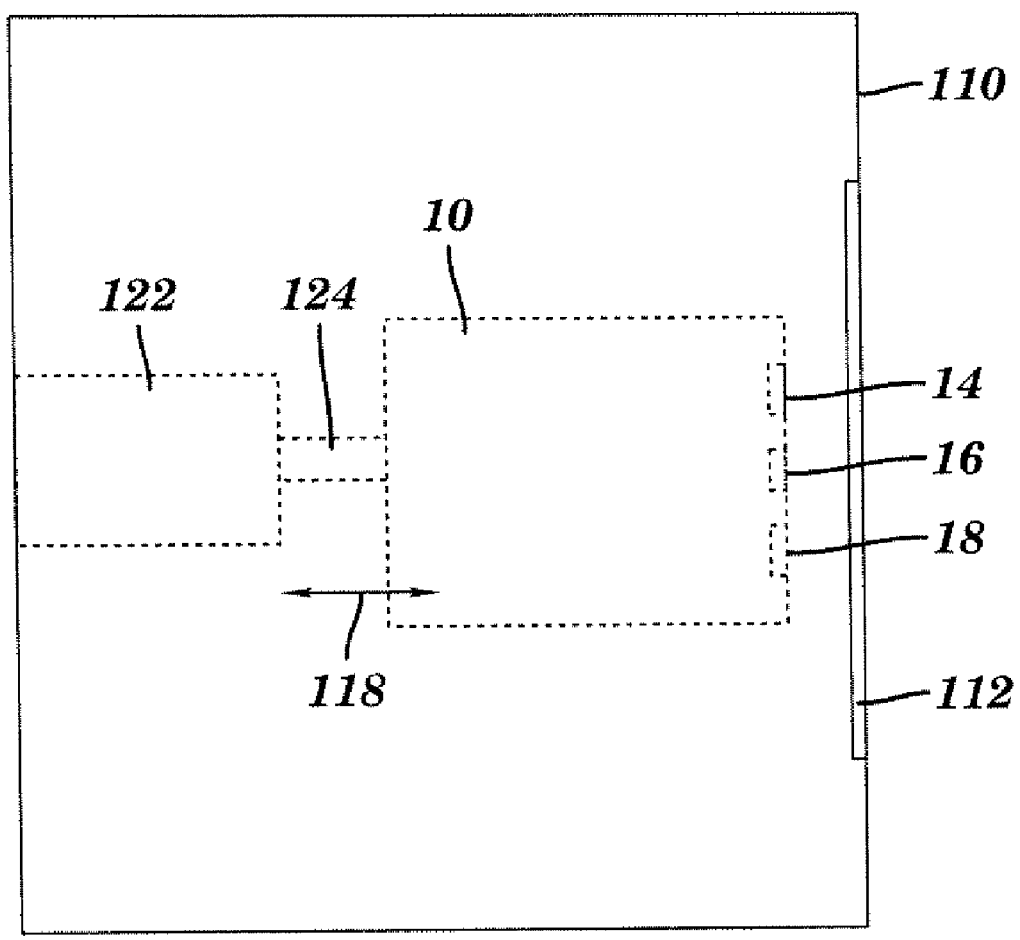
FIG. 4 is a top-view of the fixed position device enclosed in an opaque housing and adjustable with an actuator in another system for generating one or more keys in accordance with other embodiments of the present invention.

Another system 11(4) for generating one or more secret keys in accordance with other embodiments of the present invention is illustrated in FIG. 4. System 11(4) is the same as system 11(2) except as described herein. In system 11(4), the fixed position device 10 again is enclosed in an opaque housing 110 with a window 112 as described with reference to FIGS. 2A and 2B, although the opaque housing 110 is optional. Additionally, an actuator system 120 which a driving shaft 124 is coupled to the fixed position device 10, although other types and numbers of actuator systems or other movement systems can be used. When the actuator system 122 is engaged, the actuator system drives the shaft 124 to longitudinally move the fixed position device 10, although the actuator system 122 can be positioned to move the fixed position device 110 in other directions. For example, the actuator system 122 could be placed on a side of the fixed position device 10 perpendicular to the connection side illustrated in FIG. 4 which will move the fixed position device 10 laterally. In another example, two or three actuator systems 122 can be simultaneously used to cause the fixed position device 10 to move in two or three axis, respectively. The movement of the actuator system 122 is periodic, although other movements of the actuator system 122 can be used, such as randomly, pseudo-randomly, or with a chaotic motion. The actuator system 122 operation is controlled and monitored by the processing system 17 so that the processing system 17 can accurately determine the distance between the energy emitter 14 and receiver 18 and the window 112.

Figure 5:
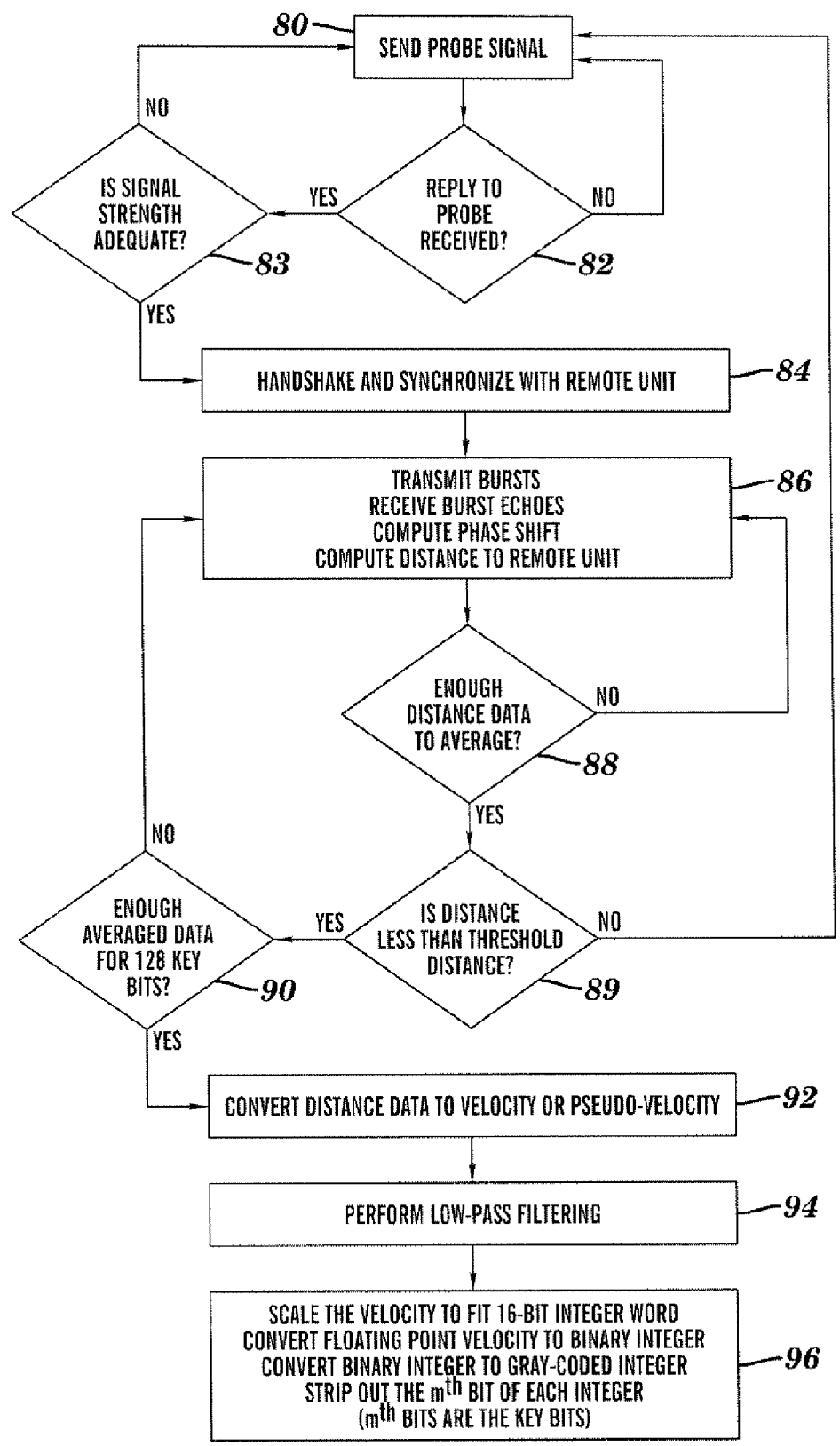
FIG. 5 is a flowchart of a method for independently generating one or more keys at two or more devices in accordance with other embodiments of the present invention.
Figure 6:
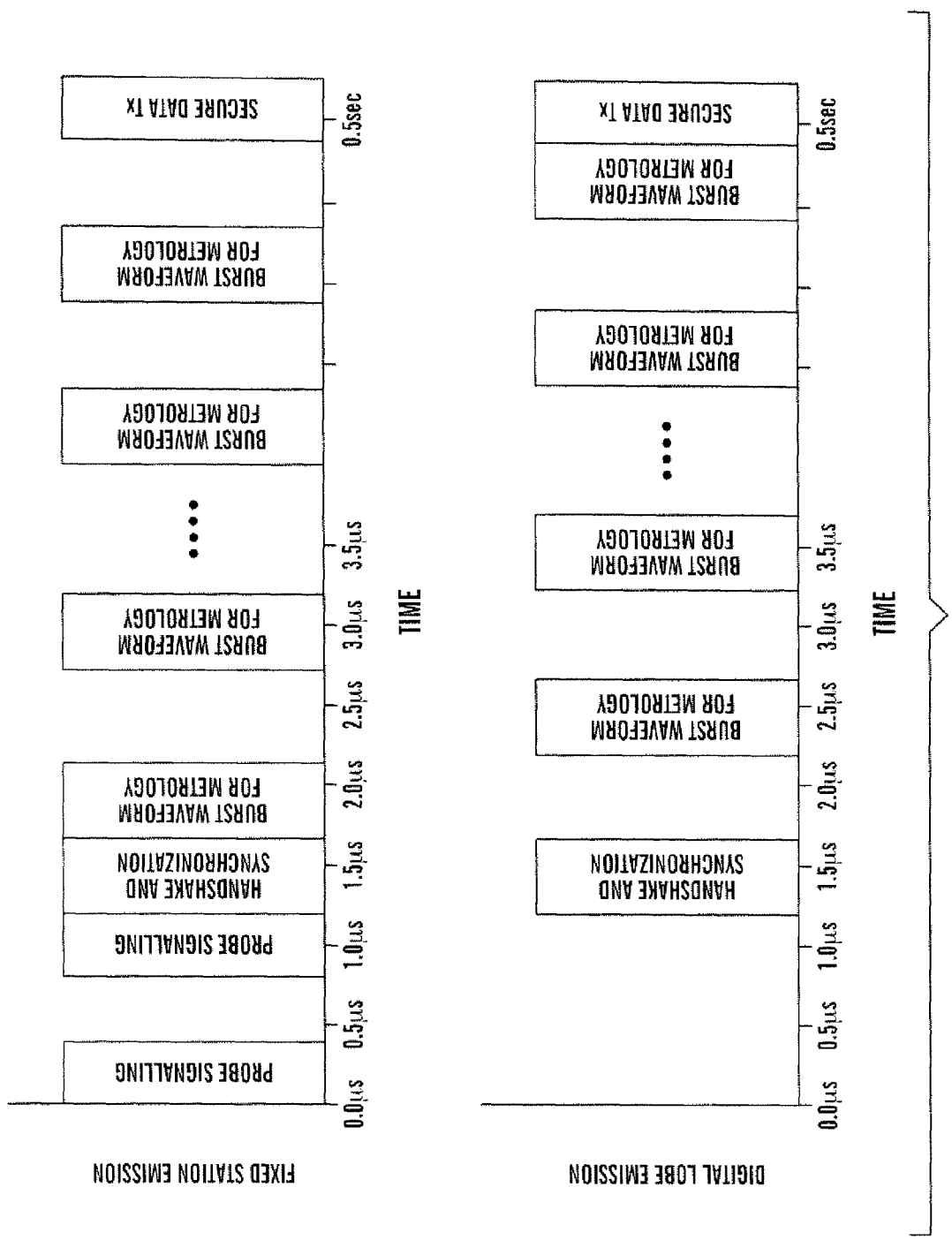
FIG. 6 is a timing diagram of the emissions of the fixed position device and the non-fixed position device.

A method for generating one or more keys will now be described with reference to FIGS. 1-10. The present invention generates bits for a secret key substantially simultaneously between devices 10 and 50 based upon the common distance between them. The key bits are not communicated between the two devices, but are independently generated and are identical. In particular for these embodiments of the present invention, a flowchart of a method for generating one or more secret keys is illustrated in FIG. 5 and a timing diagram of emissions is illustrated in FIG. 6 for the fixed position device 10 (referred to as "Fixed Station Emission) in this example and for the non-fixed position device 50 (referred to as, "Digital Lobe Emission") in this example.

In step 80, the fixed position device 10 using energy emitter 14 in the transmission system 13 periodically sends out a probe signal to identify the presence of a non-fixed position device 50, although other manners for identifying the presence of device 50 with respect to device 10 can be used, the probe signal can be sent in other manners, such as randomly, and the device 50 could send probe signals to identify the presence of the device 10. When the probe signal strikes a reflector 56 on a surface 74 of a non-fixed position device 50, at least a portion of the probe signal may be reflected back towards the receiver 18 in the reception system 15, although other manners for signaling the presence of the non-fixed position device 50, such as having the non-fixed position device 50 transmit a new signal using the energy emitter 58 in the transmission system 51 upon receipt of a probe signal by the receiver 72 in the reception system 53.

The probe signal and/or the response to the probe signal may need to be enabled by a user at one of the devices 10 or 50. This enabling can be accomplished by the act of entering in a password, PIN number, voice activation, by activating a switch, or by the use of a biometric characteristic of the user such as a thumb or fingerprint scan, or eye-scan, although other authentication techniques could be used.

In step 82, the fixed position device 10 using receiver 18 in reception system 15 monitors for a reflected probe signal, although the receiver 18 could monitor for other types of signals, such as a new response signal to a probe signal. If a reply to probe signal is not received, then the No branch is taken back to step 80. If a reply to probe signal is received, then the Yes branch is taken to step 83.

In step 83, the processing system 17 determines if the signal strength of the reply to the probe signal is adequate by comparing the amplitude of the reply signal to a threshold stored in memory in processing system 17, although other manners for determining if there is adequate signal strength can be used and other ways of obtaining the threshold can be used. In this particular embodiment, the processing system 17 determines the amplitude of the reply signal using a Discrete Fourier Transform, although other manner for determining the amplitude or signal strength can be used. With some locations and positions of the fixed position device 10 with respect to the non-fixed position device 50, the signal strength may not be adequate to obtain suitable measurements of one or more shared characteristics, such as the distance between the devices 10 and 50 over a period of time or the velocity of one or more of the devices 10 and 50 over a period of time. By way of example, if the surfaces 12 and 74 of devices 10 and 50, respectively, are not substantially facing one another, the emission cone 20 and 60 from one or both devices 10 or 50 may not illuminate or poorly illuminate, the opposing surfaces, particularly the reflector 16 or 56, or a receiver 18 or 72. If the signal strength does not exceed the threshold, then the No branch is taken back to step 80. If the signal strength does exceed the threshold, then the Yes branch is taken back to step 84.

In step 84, the fixed position device 10 and the non-fixed position device 50 conduct a handshake and synchronization. As illustrated in FIG. 6, the handshake and synchronization operations are fairly short and are followed by several burst emissions described below. Since techniques for handshaking and synchronization between devices are well known to those of ordinary skill in the art, they will not be described in detail herein.

In step 86, the separation distance between devices 10 and 50 is measured by each of the devices 10 and 50 over a period of time during one or more swipes or passes as illustrated in FIGS. 1 and 6-8B, although other types and numbers of shared characteristics between the devices 10 and 50 could be measured, such as velocity. By way of example, device 50 will emit energy from energy emitter 58 directed at the surface 12 of device 10 including the reflector 16 which will backscatter energy 62 towards the surface 74 including receiver 72 of device 50 as illustrated in FIG. 7B. Alternately, when device 50 is not actively measuring the separation distance 30 or change in distance, then energy emitter 14 of device 10 will emit energy directed at the surface 74 of device 50 including the reflector 56 which will backscatter energy towards the surface 12 including receiver 18 of device 10. Accordingly, in this example the burst emissions alternate between the devices 10 and 50, and are used for measuring the distance 30 or velocity between the devices 10 and 50 during the swipe. As illustrated by this example, the devices 10 and 50 need to be arranged in a geometry where the surfaces 12 and 74 are substantially facing each other, although other manners for obtaining the measurements in other orientations could be used.

Although in this example the energies are sequentially emitted, other methods can be used. For example, if the energies emitted by the devices 10 and 50 are different, such as electromagnetic energy of differing wavelengths, then devices 10 and 50 can emit energy simultaneously to measure the swipe profile or exchange data, so long as adequate filtering is provided at the receiver of 10 and 50 to prevent the reception of the emission of the opposing device.

Typically, a burst comprises a periodic amplitude-modulated emission from the energy emitters 14 and 58 in devices 10 and 50, respectively. The modulation waveform during the burst can be sinusoidal, square wave, or any other periodic waveform, although other types of emissions could be used.

To determine the distance 30 between the devices 10 and 50, the processing systems 17 and 55 using data from the energy emitters 14 and 58 and the receivers 18 and 72 in devices 10 and 50, respectively, look at the change in phase between the emitted signal and the received signal. The distance 30 can be computed by the processing system 17 and 55 using the formula $d=\lambda(\Delta\phi)/4\pi$, where d is the distance 30, $\lambda$ is the wavelength of the modulation frequency (e.g., $\lambda=6$ meters for a modulation frequency of 50 MHz), and $\Delta\phi$ is the phase shift between the received and transmitted signals. The phase shift measurement can be performed with conventional quadrature detection methods, or by methods and systems taught in U.S. Pat. No. 7,202,941, which is herein incorporated by reference in its entirety. If one of the embodiments in FIGS. 2A-4 is used, then the processing systems 17 and 55 take into account the additional and possibly varying distance between surface 12 and window 112 when determining distance or other shared characteristics.

Although distance measurements are illustrated in this example, measurements of other shared characteristics between the devices 10 and 50 can be taken. For example, the relative velocity of device 50 with respect to device 10 can be measured by directly measuring the Doppler shift of the received echo in processing system 17. Alternately, the burst can be truncated such that only one half-cycle of modulation is transmitted, which is a pulse, whose round-trip travel time can be determined with conventional pulse-time-of-flight distance measuring methods. In this case the distance 30 is $d=ct/2$, where c is the speed of light, and t is the round-trip propagation time. Note that d is proportional to the round-trip time t, and the value of t can be used as a proxy for d.

Additionally, although in these particular embodiments the methods of measuring distance or velocity described herein entail measuring the round-trip time of flight of energy from the emitting device, to the reflecting device, and back to the emitting device, other techniques can be used. For example, a unidirectional technique for measuring distance or velocity in which the measuring energy flows from one device to another and not back to the originating device, can have lower implementation costs and a simplified electronic architecture and processing algorithm, although certain requirements on the electronic components in these devices may exist, such as high stability in the electronic clocks.

Figure 7A:
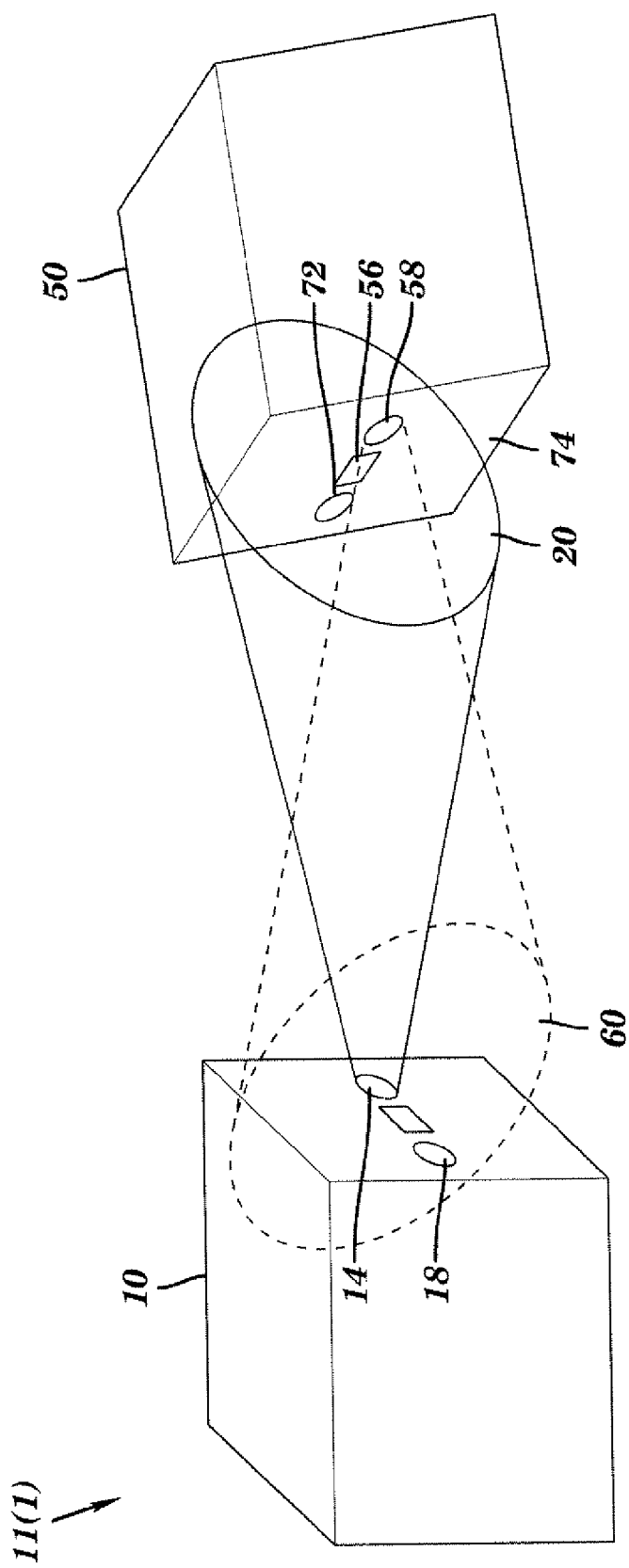
FIG. 7A is a perspective view of a fixed position device and a non-fixed position device illustrating their orientations and emissions.
Figure 7B:
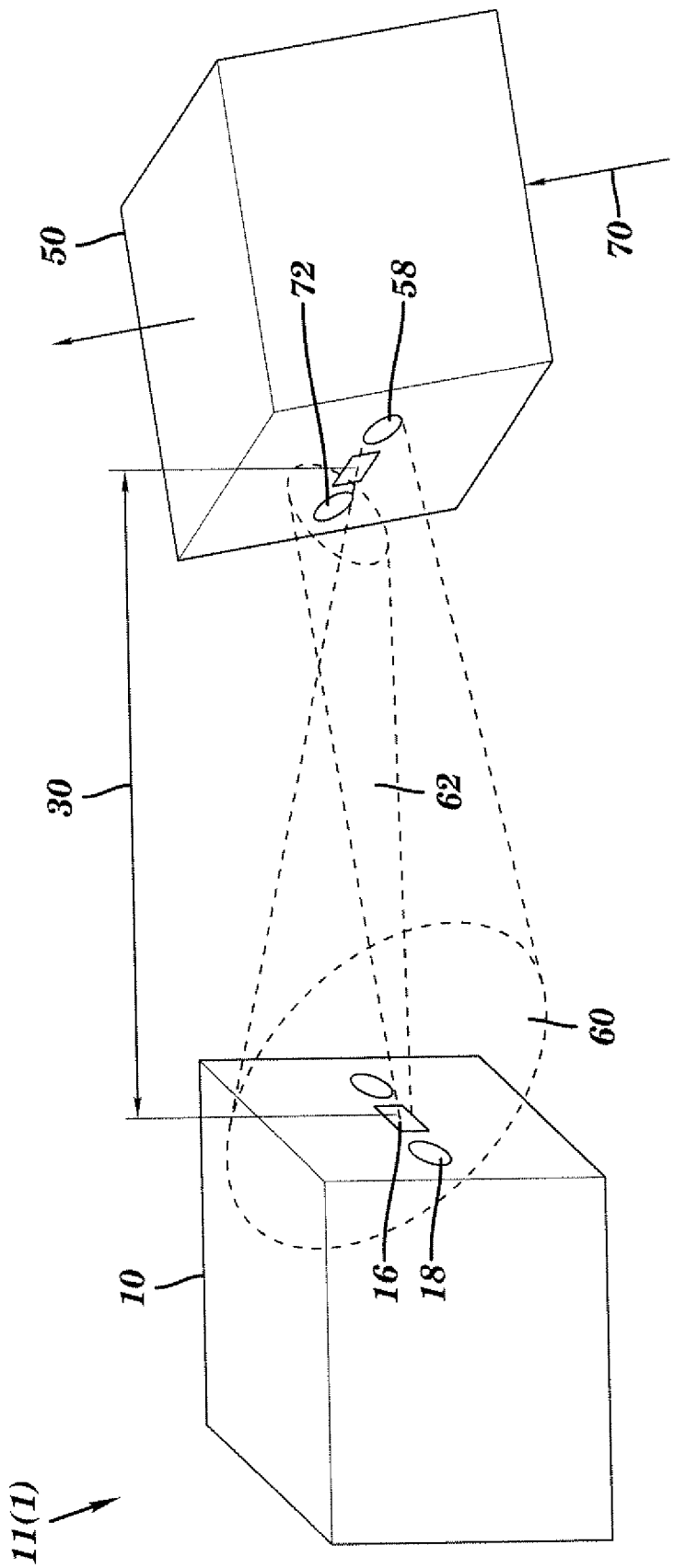
FIG. 7B is a perspective view of the fixed position device and the non-fixed position device illustrating an emission and back-reflection while the non-fixed position device is in motion.
Figure 8A:
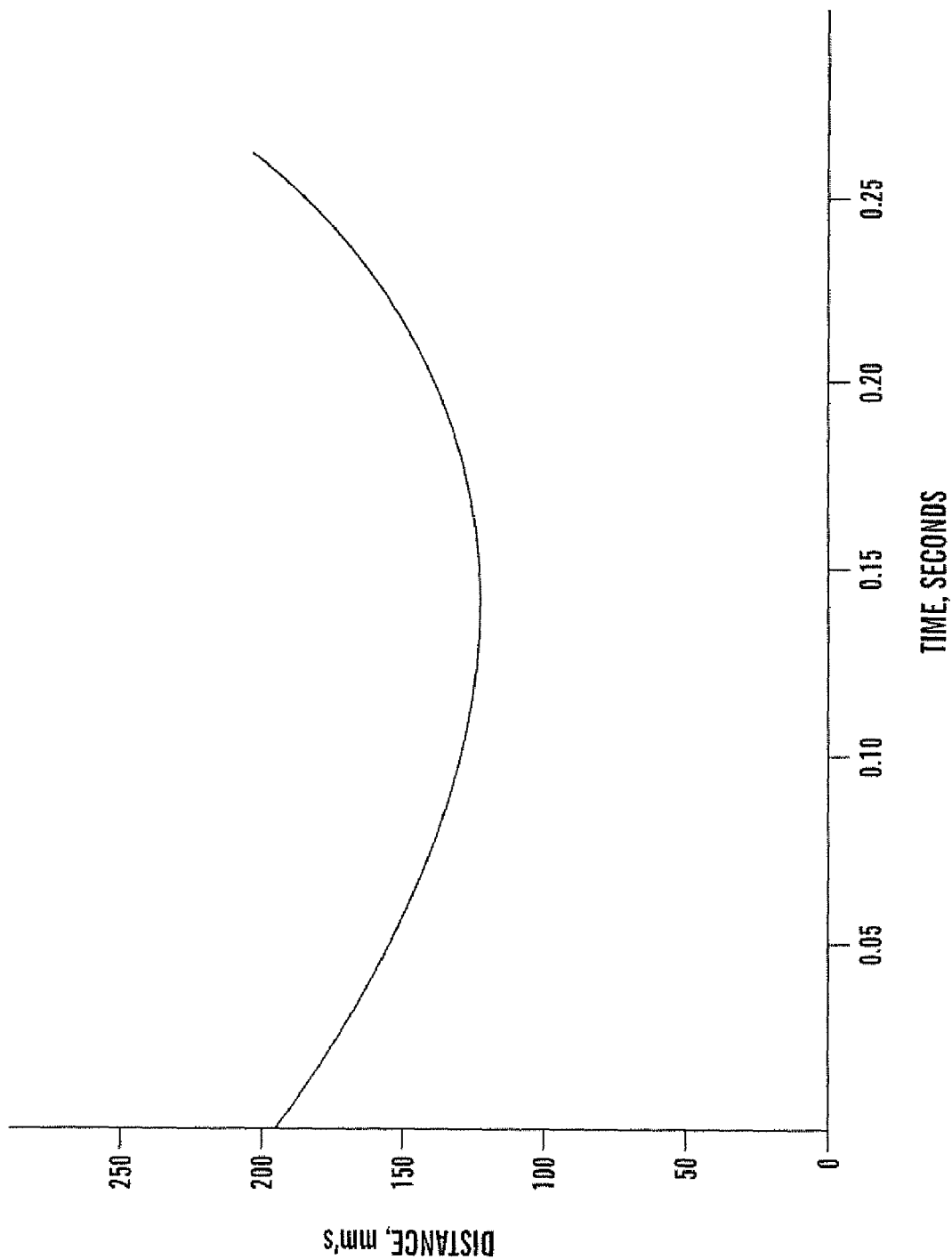
FIG. 8A is a graph of distance between the fixed position device and the non-fixed position device as a function of time during a single swipe or pass.
Figure 8B:
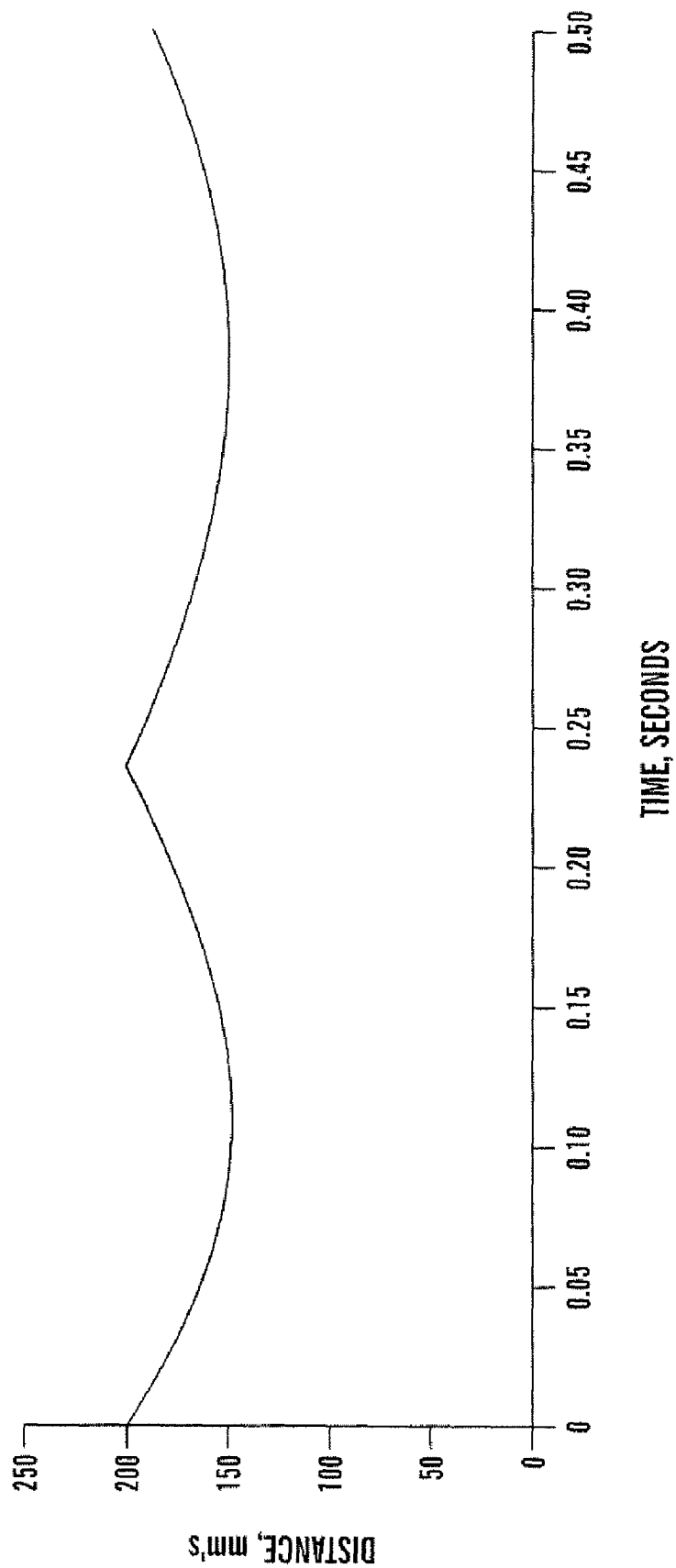
FIG. 8B is a graph of distance between the fixed position device and the non-fixed position device as a function of time during a double swipe or pass.

As illustrated in FIGS. 7B, 8A, and 8B, the non-fixed position device 50 moves along in swiping motion along a direction of arrow 70 by fixed position device 10, although the device 10 could move with respect to device 50 or both devices 10 and 50 could be moving. This unique change in position for each swipe or pass of device 50 by device 10, results in a changing separation distance 30 between devices 10 and 50 which is used for generation of one or more secret keys. This single swipe in which device 50 moves past device 10 just once will in general have a varying distance between the devices such that the start and end distances of the swipe are greater than a mid-swipe distance. This change in distance over time also results in a varying velocity between the devices 50 and 10 as well. Although device 50 is shown moving and device 10 is fixed, other configurations can be used, such as having both devices moving with respect to each other.

Although one swipe or pass as illustrated in FIG. 8A, other numbers of swipes or passes could be used to capture measurement data and provide even greater security, such as the double swipe or pass illustrated in FIG. 8B. Although no two swipes will be identical, owing to the user-induced variations of motion of the device 50, the double-pass swipe has the advantage over a single swipe because the path signature will be more unique will produce a more robust set of bits for generating the one or more secret keys.

In step 88, the processing systems 17 and 55 in devices 10 and 50, respectively, determine if enough measurements of the distance 30 between devices 10 and 50 as device travels along the path 70 have been obtained to average, although other shared characteristics could be measured and averaged. Typically, in most distance and/or velocity measuring devices that operate in an open medium, such as air or free space, stray and ambient signals, such as radio frequency interference in the RF spectrum, or stray light in the visible spectrum, will create electronic noise that reduces the precision of the distance or velocity measurement. To offset this problem, the distance or velocity measurements can be made over multiple bursts which are then averaged together to improve the measurement precision. This can result in several thousand bursts being transmitted by the energy emitters 14 and 58 in each of the device 10 and 50, respectively, during a swipe of device 50 by device 10.

By way of example only, a typical burst modulation frequency is 50 MHz, and typically there are 50 cycles of this modulation per burst, such that each burst lasts 1 μs. Given that one distance or velocity measurement can occur during one burst and that in 0.5 seconds there can be 250,000 bursts for each of the devices 10 and 50, then 250,000 measurements can be made in 0.5 seconds. If 250 key bits are needed, then sets of 1,000 measurements can be averaged together by the processing systems 17 and 55 in the devices 10 and 50, respectively, to improve the precision of the measurement. As explained in greater detail herein, since one key bit is later obtained from each averaged measurement, greater precision for each average measurement for each of the devices 10 and 50 results in greater precision on each of the key bits.

Accordingly, if in step 88 the processing systems 17 and 55 in devices 10 and 50, respectively, determine enough measurements of the distance 30 between devices 10 and 50 have not been obtained to average, then the No branch is taken back to step 86 where additional distance measurements are taken, although again other shared characteristics between the devices 10 and 50 could be measured. If in step 88 the processing systems 17 and 55 in devices 10 and 50, respectively, determine enough measurements of the distance 30 between devices 10 and 50 have been obtained to average, then the Yes branch is taken to step 89.

In step 89, the processing systems 17 and 55 in devices 10 and 50, respectively, determine if one or more of the averaged distance measurements are less than a predetermined threshold distance. This step is optional and provides a safeguard to prevent long-distance swipes or passes of a device 50 with respect to a device 10 which are impractical and typically arise from a person trying to surreptitiously exchange data with one of the devices 10 or 50. For most applications the maximum distance 30, as shown in FIG. 7B, between the fixed position device 10 and a non-fixed position device 50 is less than ten to twelve inches (300 mm), although other distances could be used and these distances are stored in memory in the processing systems 17 and 55, respectively. Distances 30 in excess of this predetermined threshold would be immediately invalidated by the processing systems 17 and 55, respectively.

Accordingly, if the processing systems 17 and 55 in devices 10 and 50, respectively, determine one or more of the averaged distance measurements is not less than a threshold distance, then the No branch is taken back to step 80 where the process starts over. If the processing systems 17 and 55 in devices 10 and 50, respectively, determine the averaged distance measurements are each less than a threshold distance, then the Yes branch is taken back to step 90, although other numbers of measurements which are below the distance threshold could be used, such requiring as ninety percent of the measurements below the distance threshold.

In step 90, the processing systems 17 and 55 in devices 10 and 50, respectively, determine if enough averaged distance measurement data has been obtained to generate 128 key bits, although other numbers of key bits with other requirements for obtained data could be used. Typically, the sequence of key bits required by many popular encryption methods is 128 bits, although again other numbers of key bits could be used depending on the desired degree of data security, such as 256 bits. If the processing systems 17 and 55 in devices 10 and 50, respectively, determine enough averaged distance measurement data has not been obtained to generate 128 key bits, then the No branch is taken back to step 86 to obtain additional distance measurements. If the processing systems 17 and 55 in devices 10 and 50, respectively, determine enough averaged distance measurement data has been obtained to generate 128 key bits, then the Yes branch is taken to step 92.

In step 92, the processing systems 17 and 55 in devices 10 and 50, respectively, convert the averaged distance measurements to velocity or pseudo velocity, although other conversions could be performed, such as converting velocity to acceleration or pseudo acceleration. Velocity or pseudo velocity readings are used because most PTOF and phase-measuring distance measurements have a non-zero distance offset that varies from unit to unit. This offset makes it difficult for two devices 10 and 50 to measure the same distances, thus resulting in different bits for the secret key. However, the computation of velocity, being a time rate of change of distance, inherently subtracts out the offset such that the "velocity offset" is zero. As a result, bits generated from the velocity readings obtained from the averaged distance measurements for the devices 10 and 50 will be identical. Although velocity is used, other converted parameters could be used, such as acceleration or pseudo acceleration obtained from velocity measurements or distance measurements could be used to generate the bits for the one or more keys if the offset issue is addressed.

The velocity is computed by the processing systems 17 and 55 in devices 10 and 50, respectively, as the difference between two sequential distance measurements divided by the time between them. The resulting velocity is used to generate a key bit as explained in greater detail below. This division operation, in which the change in distances is divided by a constant differential time value, performed by the processing systems 17 and 55 in devices 10 and 50, respectively, is essentially a scaling operation since the differential time value is a constant. Since the change in distance between two sequential distance measurements can be small, not much larger than the residual noise level still present after the averaging process, the processing systems 17 and 55 in devices 10 and 50, respectively, select distance measurements whose differential values are more likely to be greater. By way of example only, the processing systems 17 and 55 in devices 10 and 50, respectively, may select one averaged distance measurement obtained at the start of a swipe and one averaged distance measurement obtained at the middle of a swipe, for a single-swipe system. Alternately, with a double-swipe or pass where 128 key bits are desired, the processing systems 17 and 55 in devices 10 and 50, respectively, may select the start of the first swipe (measurement 0), the end of the first swipe (measurement 64) which is also the start of the second swipe, as well as the end of the end of the second swipe (measurement 128). The shortest distances are likely to be in the middle of the two swipes (measurements 32 and 96). Therefore, the maximum difference in distances is likely to be obtained when the distances are 32 measurements apart.

Using non-sequential distances in the velocity computation will result in a quantity hereafter referred to as a pseudo-velocity (or pseudo velocity). Alternatively, it may also be desirable to generate 128 key bits for encryption and another 128 bits for message integrity checks.

Similarly, changes in velocity, or pseudo velocity, can result in an acceleration quantity which also can be used by the processing systems 17 and 55 in devices 10 and 50, respectively, to generate the bits for the one or more secret keys. The velocity or pseudo velocity values used in the computation by the processing systems 17 and 55 in devices 10 and 50, respectively, can be adjacent values, giving rise to acceleration or they can be non-adjacent and result in a pseudo-acceleration quantity.

In step 94, after a number of pseudo velocity readings are converted from the distance measurements, the pseudo velocity readings can be further filtered to reduce any residual noise effects by the filtering systems 29 and 69 in devices 10 and 50, respectively. With the optional filtering, the one or more keys generated in one device 10 are even more likely to match the one or more keys generated by the other device. In this particular embodiment, the filtering is a low-pass filter, such as a "box-car" average which is essentially a convolution function with unity coefficients, an IIR (infinite impulse response) or FIR (finite impulse response), whose width and coefficients can be determined, such that a desired filter function can be generated, although other types and numbers of filters could be used. Since the structure and operation of filtering systems are well known to those of ordinary skill in the art, they will not be described in detail here.

In step 96, the processing systems 17 and 55 in devices 10 and 50, respectively, a bit from each pseudo velocity is selected to generated the secret key, although other numbers of bits could be selected from other types and numbers of converted measurements, such as selecting a bit from an acceleration or pseudo acceleration reading. An example of the generation of bits for the one or more secret keys by the processing systems 17 and 55 in devices 10 and 50, respectively, will now be described with reference to FIGS. 9 and 10.

Referring more specifically, to FIG. 9, the processing systems 17 and 55 in devices 10 and 50, respectively, converts the averaged and filtered distance measurements into the columns in this table. Column 49 denotes the particular number of the averaged and filtered distance measurement, column 48 is the averaged distance (in millimeters), column 47 is the pseudo velocity in floating point format, column 46 is the pseudo velocity converted to a binary integer value, and column 45 is the binary format of the binary integer value of each of the pseudo velocity readings.

Referring more specifically to FIG. 10, the binary format of the binary integer value of each of the pseudo velocity readings is illustrated. In this particular embodiment, the processing systems 17 and 55 in devices 10 and 50, respectively, determine that the bits fall into four different categories based on stored data which identifies which columns are measurably random and unaffected by noise based on the number of bits and sample sizes, although other manners for separating the bits into other numbers and types of categories can be used. The least significant bits in the columns in section 55 are dominated by random noise that survived the filtering and averaging processes and are likely to be different between the devices 10 and 50. At the other extreme, the most significant bits in the column in section 52 are all zero, resulting from a relatively low velocity between the devices 10 and 50. In this example, the bits in group 52 are not measurably random and cannot be used for generating the one or more keys. Next, the columns in section 53 are bits that are both zero and one, but are still not measurably random as they have strong serial correlation and thus cannot be used for generating the one or more secret keys. Next, the columns in section 54 lie above the noise, are non-correlated and measurably random, and are known to both devices 10 and 50. Next, the processing systems 17 and 55 in devices 10 and 50, respectively, selects the bits from one or more of these columns to generate the one or more secret keys. By way of example, if this section 54 is three columns wide, such as in columns eight, nine, and ten, then one or more of can be used. In this example, the bits in column nine are selected by the processing systems 17 and 55 in devices 10 and 50, respectively, to generate the one or more secret keys, although two or more columns could be selected. Accordingly, the bits in column nine for both devices 10 and 50 will be independently developed without transmitting the secret key or keys between the devices 10 and 50 and the secret key or keys will be identical at devices 10 and 50. In this example, the bits in column nine can now be used by the devices 10 and 50 as the secret key for applications, such as encrypting and decrypting data sent between devices 10 and 50 or providing for secure message integrity checks on data transmitted between devices 10 and 50 in manners well know to those of ordinary skill in the art.

Accordingly, as illustrated herein the present invention provides an effective and secure method and system for simultaneously and independently generating one or more secret keys for encrypting and decrypting data sent between devices based on measurements of one or more common or shared characteristics. The present invention also is an effective and secure method for simultaneously and independently generating one or more secret keys that provide for secure message integrity checks on data transmitted between devices. These generated secret keys can be used in standard cryptographically-secure communication schemes

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for independently generating one or more keys, the method comprising:
   obtaining at two or more devices data based on movement of at least one of the devices with respect to the other device;
   converting at each of the devices the obtained data into a plurality of binary numbers;
   selecting at each of the devices from a set of bits for the plurality of binary numbers a subset of one more of the bits;
   generating one or more keys based on the selected subset of one or more bits at each of the devices for use in securing communications between the devices, wherein the one or more keys at each of the devices is the same.

2. The method as set forth in claim 1 wherein the obtaining the data further comprises obtaining the data in response to movement of at least one of the devices with the respect to the other device during one or more passes between the devices.

3. The method as set forth in claim 2 wherein the obtaining the data further comprises obtaining the data during two or more passes between the devices.

4. The method as set forth in claim 1 wherein the obtained data comprises pseudo-velocity measurements.

5. The method as set forth in claim 1 further comprising converting the obtained data into one or more converted parameters, wherein the generating the one or more keys is based on the one or more converted parameters.

6. The method as set forth in claim 5 wherein the converted parameters comprise one of distance, velocity, pseudo-velocity, acceleration, and pseudo-acceleration readings.

7. The method as set forth in claim 1 further comprising determining if an amount of the obtained data is greater than a quantity threshold for averaging at least portions of the data, wherein the obtaining the data obtains additional data if the amount of the obtained is less than the quantity threshold.

8. The method as set forth in claim 1 wherein the obtained data comprises distance measurements and further comprising determining if the distance measurements are less than a distance threshold, wherein the generating the key generates when the distance measurements are less than the distance threshold.

9. The method as set forth in claim 1 further comprising determining if the obtained data is less than a data threshold for the generating the one or more keys, wherein the obtaining the data obtains additional data if the obtained data is less than the data threshold.

10. The method as set forth in claim 1 further comprising averaging one or more portions of the obtained data, wherein the generating the one or more keys is based on the averaged portions of the obtained data.

11. The method as set forth in claim 1 further comprising filtering the obtained data before the generating the one or more keys.

12. The method as set forth in claim 1 wherein the obtaining the data further comprises obscuring a data acquisition system in at least one of the devices used for the obtaining the data.

13. The method as set forth in claim 12 wherein the obscuring comprises at least one of at least partially concealing the data acquisition system and moving the data acquisition system.

14. The method as set forth in claim 1 wherein the selecting further comprises:
  determining a first set of least significant bits in the binary numbers with noise below a noise threshold;
  determining a second set of most significant bits in the binary numbers which are not measurably random; and
  determining a third set of two or more bits in each of the binary numbers which are measurably random based on the determination of the first set of least significant bits in the binary numbers with noise below a noise threshold and the second set of most significant bits in the binary numbers which are not measurably random, wherein the selecting at least one bit is selected from the determined third set.

15. The method as set forth in claim 1 further comprising identifying a presence of one of the devices with respect to another one of the devices, wherein the obtaining the data further comprises obtaining the data when the identifying signals the presence of one of the devices with respect to another one of the devices.

16. The method as set forth in claim 15 further comprising determining if there is adequate signal strength for the obtaining the data, wherein the obtaining the data further comprises obtaining the data when the signal strength is determined to be adequate.

17. The method as set forth in claim 1 further comprising synchronizing the devices before the obtaining the data.

18. A computer readable medium having stored thereon instructions for independently generating one or more keys comprising machine executable code which when executed by at least one processor, causes the processor to perform steps comprising:
  obtaining data based on movement of at least one device with respect to another device;
  converting the obtained data into a plurality of binary numbers;
  selecting from a set of bits for the plurality of binary numbers a subset of one more of the bits;
  generating one or more keys based on the selected subset of one or more bits for use in securing communications between the devices, wherein the one or more keys at each of the devices is the same.

19. The medium as set forth in claim 18 wherein the obtaining the data further comprises obtaining the data in response to movement of at least one of the devices with the respect to the other device during one or more passes between the devices.

20. The medium as set forth in claim 19 wherein the obtaining the data further comprises obtaining the data during two or more passes between the devices.

21. The medium as set forth in claim 18 wherein the obtained data comprises pseudo-velocity measurements.

22. The medium as set forth in claim 18 further comprising converting the obtained data into one or more converted parameters, wherein the generating the one or more keys is based on the one or more converted parameters.

23. The medium as set forth in claim 22 wherein the converted parameters comprise one of distance, velocity, pseudo-velocity, acceleration, and pseudo-acceleration readings.

24. The medium as set forth in claim 18 further comprising determining if an amount of the obtained data is greater than a quantity threshold for averaging at least portions of the data, wherein the obtaining the data obtains additional data if the amount of the obtained is less than the quantity threshold.

25. The medium as set forth in claim 18 wherein the obtained data comprises distance measurements and further comprising determining if the distance measurements are less than a distance threshold, wherein the generating the key generates when the distance measurements are less than the distance threshold.

26. The medium as set forth in claim 18 further comprising determining if the obtained data is less than a data threshold for the generating the one or more keys, wherein the obtaining the data obtains additional data if the obtained data is less than the data threshold.

27. The medium as set forth in claim 18 further comprising averaging one or more portions of the obtained data, wherein the generating the one or more keys is based on the averaged portions of the obtained data.

28. The medium as set forth in claim 18 further comprising filtering the obtained data before the generating the one or more keys.

29. The medium as set forth in claim 18 wherein the obtaining the data further comprises obscuring a data acquisition system in at least one of the devices used for the obtaining the data.

30. The medium as set forth in claim 29 wherein the obscuring comprises at least one of at least partially concealing the data acquisition system and moving the data acquisition system.

31. The medium as set forth in claim 18 wherein the selecting further comprises:
   determining a first set of least significant bits in the binary numbers with noise below a noise threshold;
   determining a second set of most significant bits in the binary numbers which are not measurably random; and
   determining a third set of two or more bits in each of the binary numbers which are measurably random based on the determination of the first set of least significant bits in the binary numbers with noise below a noise threshold and the second set of most significant bits in the binary numbers which are not measurably random, wherein the selecting at least one bit is selected from the determined third set.

32. The medium as set forth in claim 18 further comprising identifying a presence of one of the devices with respect to another one of the devices, wherein the obtaining the data further comprises obtaining the data when the identifying signals the presence of one of the devices with respect to another one of the devices.

33. The medium as set forth in claim 32 further comprising determining if there is adequate signal strength for the obtaining the data, wherein the obtaining the data further comprises obtaining the data when the signal strength is determined to be adequate.

34. The medium as set forth in claim 18 further comprising synchronizing the devices before the obtaining the data.

35. A computing device comprising:
   one or more processors;
   a memory coupled to the one or more processors which are configured to execute programmed instructions stored in the memory comprising:
      obtaining data based on movement of at least one computing device with respect to another computing device;
      converting the obtained data into a plurality of binary numbers;
      selecting from a set of bits for the plurality of binary numbers a subset of one more of the bits;
      generating one or more keys based on the selected subset of one or more bits for use in securing communications between the computing devices, wherein the one or more keys at each of the computing devices is the same.

36. The device as set forth in claim 35 wherein the obtaining the data further comprises obtaining the data in response to movement of at least one of the computing devices with the respect to the other computing device during one or more passes between the computing devices.

37. The device as set forth in claim 36 wherein the obtaining the data further comprises obtaining the data during two or more passes between the computing devices.

38. The device as set forth in claim 35 wherein the obtained data comprises pseudo-velocity measurements.

39. The device as set forth in claim 35 further comprising converting the obtained data into one or more converted parameters, wherein the generating the one or more keys is based on the one or more converted parameters.

40. The device as set forth in claim 39 wherein the converted parameters comprise one of distance, velocity, pseudo-velocity, acceleration, and pseudo-acceleration readings.

41. The device as set forth in claim 35 further comprising determining if an amount of the obtained data is greater than a quantity threshold for averaging at least portions of the data, wherein the obtaining the data obtains additional data if the amount of the obtained is less than the quantity threshold.

42. The device as set forth in claim 35 wherein the obtained data comprises distance measurements and further comprising determining if the distance measurements are less than a distance threshold, wherein the generating the key generates when the distance measurements are less than the distance threshold.

43. The device as set forth in claim 35 further comprising determining if the obtained data is less than a data threshold for the generating the one or more keys, wherein the obtaining the data obtains additional data if the obtained data is less than the data threshold.

44. The device as set forth in claim 35 further comprising averaging one or more portions of the obtained data, wherein the generating the one or more keys is based on the averaged portions of the obtained data.

45. The device as set forth in claim 35 further comprising filtering the obtained data before the generating the one or more keys.

46. The device as set forth in claim 35 wherein the obtaining the data further comprises obscuring a data acquisition system in at least one of the computing devices used for the obtaining the data.

47. The device as set forth in claim 46 wherein the obscuring comprises at least one of at least partially concealing the data acquisition system and moving the data acquisition system.

48. The device as set forth in claim 35 wherein the selecting further comprises:
   determining a first set of least significant bits in the binary numbers with noise below a noise threshold;
   determining a second set of most significant bits in the binary numbers which are not measurably random; and
   determining a third set of two or more bits in each of the binary numbers which are measurably random based on the determination of the first set of least significant bits in the binary numbers with noise below a noise threshold and the second set of most significant bits in the binary numbers which are not measurably random, wherein the selecting at least one bit is selected from the determined third set.

49. The device as set forth in claim 35 further comprising identifying a presence of one of the computing devices with respect to another one of the computing devices, wherein the obtaining the data further comprises obtaining the data when the identifying signals the presence of one of the computing devices with respect to another one of the computing devices.

50. The device as set forth in claim 49 further comprising determining if there is adequate signal strength for the obtaining the data, wherein the obtaining the data further comprises obtaining the data when the signal strength is determined to be adequate.

51. The device as set forth in claim 35 further comprising synchronizing the computing devices before the obtaining the data.

* * * * *